(12) United States Patent
Tsiatsis et al.

(10) Patent No.: US 12,470,919 B2
(45) Date of Patent: Nov. 11, 2025

(54) AUTHENTICATION SERVER FUNCTION SELECTION IN AUTHENTICATION AND KEY MANAGEMENT

(71) Applicant: TELEFONAKTIEBOLAGET LM ERICSSON (PUBL), Stockholm (SE)

(72) Inventors: Vlasios Tsiatsis, Solna (SE); Cheng Wang, Shanghai (CN); David Castellanos ZAMORA, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 577 days.

(21) Appl. No.: 17/873,672

(22) Filed: Jul. 26, 2022

(65) Prior Publication Data
US 2022/0360982 A1 Nov. 10, 2022

Related U.S. Application Data

(63) Continuation of application No. 17/289,630, filed as application No. PCT/IB2021/050564 on Jan. 25, 2021, now Pat. No. 11,399,281.

(30) Foreign Application Priority Data

Feb. 21, 2020 (WO) ................ PCT/CN2020/076132

(51) Int. Cl.
*H04L 29/06* (2006.01)
*H04L 67/141* (2022.01)
(Continued)

(52) U.S. Cl.
CPC ....... *H04W 12/0433* (2021.01); *H04L 67/141* (2013.01); *H04W 12/009* (2019.01);
(Continued)

(58) Field of Classification Search
CPC .......... H04W 12/0433; H04W 12/009; H04W 12/041; H04W 12/06; H04W 84/042; H04L 67/141
(Continued)

(56) References Cited

U.S. PATENT DOCUMENTS

2006/0205388 A1* 9/2006 Semple ............. H04W 12/0431
455/433
2018/0192289 A1 7/2018 Dao
(Continued)

FOREIGN PATENT DOCUMENTS

CN 110235458 A 9/2019
WO 2018052640 A1 3/2018
(Continued)

OTHER PUBLICATIONS

Cao, "A Survey on Security Aspects for 3GPP 5G Networks", 2020, IEEE, vol. 22, pp. 170-192 (Year: 2020).*
(Continued)

*Primary Examiner* — Taghi T Arani
*Assistant Examiner* — Gregory A Lane

(57) ABSTRACT

Embodiments include methods performed by a key management node in a communication network. Such methods can include receiving, from an application function, a request for a security key specific to an application session for a particular user. The request can include a representation of the following information associated with the particular user: a first identifier of a non-application-specific anchor security key, and a second identifier related to a network subscription. Such methods can also include, based on the representation, determining an authentication server function that generated the non-application-specific anchor security key. Other embodiments include complementary methods performed by application functions, authentication
(Continued)

server functions, and unified data management functions in the communication network. Other embodiments include network nodes configured to perform such methods.

12 Claims, 20 Drawing Sheets

(51) Int. Cl.
| | |
|---|---|
| H04W 12/00 | (2021.01) |
| H04W 12/041 | (2021.01) |
| H04W 12/0433 | (2021.01) |
| H04W 12/06 | (2021.01) |
| H04W 84/04 | (2009.01) |

(52) U.S. Cl.
CPC ......... *H04W 12/041* (2021.01); *H04W 12/06* (2013.01); *H04W 84/042* (2013.01)

(58) Field of Classification Search
USPC ............................................................ 726/6
See application file for complete search history.

(56) References Cited

U.S. PATENT DOCUMENTS

| | | | |
|---|---|---|---|
| 2019/0149521 A1 | 5/2019 | Jerichow | |
| 2019/0223063 A1 | 7/2019 | Palanigounder et al. | |
| 2019/0253889 A1 | 8/2019 | Wu et al. | |
| 2020/0059783 A1 | 2/2020 | Wifvesson | |
| 2020/0084028 A1 | 3/2020 | Wang et al. | |
| 2020/0119909 A1 | 4/2020 | Zhang et al. | |
| 2020/0136911 A1* | 4/2020 | Assali | H04L 67/1008 |
| 2021/0144135 A1 | 5/2021 | Prasad et al. | |
| 2021/0409939 A1 | 12/2021 | Baskaran et al. | |
| 2023/0068196 A1* | 3/2023 | Sasi | H04W 12/06 |

FOREIGN PATENT DOCUMENTS

| | | | |
|---|---|---|---|
| WO | 2019066720 A1 | 4/2019 | |
| WO | 2019194155 A1 | 10/2019 | |
| WO | 2020007461 A1 | 1/2020 | |
| WO | 2020249861 A1 | 12/2020 | |
| WO | WO2021147997 * | 7/2021 | ........... H04L 9/0861 |

OTHER PUBLICATIONS

Asadi, "A Survey on Device-to-Device Communication in Cellular Networks", 2014, IEEE, pp. 1-16 (Year: 2014).*
Ericsson, "AUSF selection for AKMA", 3GPP TSG-SA3 Meeting #98e, S3-200294, e-meeting, Mar. 2-6, 2020.
Ericsson, "pCR to TS 33.535: Update of the AKMA procedures", 3GPP TSG-SA3 Meeting #98e, S3-200296, e-meeting, Mar. 2-6, 2020.
SA3, "Presentation of Report to TSG: TR 33.835, Study on authentication and key management for applications; based on 3GPP credential in 5G (Release 16), version 2.0.0", 3GPP TSG-SA Meeting #86, Tdoc SP-191142, Sitges, Spain, Dec. 9-13, 2019.
3GPP TS 23.501 V16.2.0 (Sep. 2019), "3rd Generation Partnership Project; Technical Specification Group Services and System Aspects; System Architecture for the 5G System (5GS); Stage 2 (Release 16)," Sep. 2019, 3.
3GPP TS 23.502 V16.2.0, 3rd Generation Partnership Project; Technical Specification Group Services and System Aspects; Procedures for the 5G System (5GS); Stage 2 (Release 16), TS 23.502 V16.2.0, Sep. 2019.
3GPP TS 33.501 v16.0.0, 3rd Generation Partnership Project; Technical Specification Group Services and System Aspects; Security architecture and procedures for 5G system (Release 16), TS 33.501 v16.0.0, Sep. 2019.
3GPP TS 33.535 V0.2.0, "3rd Generation Partnership Project; Technical Specification Group Services and System Aspects; Authentication and key management for application; based on 3GPP credential in 5G (AKMA) (Release 16)", 3GPP TS 33.535 V0.2.0, Nov. 2019.
3GPP, TS 33.220 V16.0.0, "3rd Generation Partnership Project; Technical Specification Group Services and System Aspects; Generic Authentication Architecture (GAA); Generic Bootstrapping Architecture (GBA) (Release 16)", TS 33.220 V16.0.0, Sep. 2019.
Cao et al., "A Survey on Security Aspects for 3GPP 5G Networks", IEEE Communications Surveys & Tutorials, First Quarter, 2020, pp. 170-195, vol. 22, No. 1.
Ericsson, "New solution: Implicit Bootstrapping," 3GPP TSG SA WG3 (Security) Meeting #94, Jan. 28-Feb. 1, 2019, Kochi (India), S3-190531, 5 pages.
Li et al,. "Study and Implementation of 5G Terminal Authentication and Key Agreement", Computer Engineering and Applications, vol. 11, 2019.

* cited by examiner

```
┌─────────────────────────────────────────────────────────────────────────────┐
│ Receiving, from an application function, a request for a security key (Kaf) │
│ specific to an application session for a particular user, wherein the       │ 1410
│ request comprises a representation of the following information associated  │
│ with the particular user:                                                   │
│ a first identifier (KakmaID) of a non-application-specific anchor security  │
│ key (Kakma), and a second identifier related to a network subscription.     │
└─────────────────────────────────────────────────────────────────────────────┘
                                       ↓
┌─────────────────────────────────────────────────────────────────────────────┐
│ Based on the representation, determining an authentication server function  │ 1420
│        (AUSF) that generated the non-application-specific anchor            │
│                              security key (Kakma).                          │
│ ┌─────────────────────────────────────────────────────────────────────────┐ │
│ │ Discovering an identity of the AUSF, via a network repository function  │ │ 1421
│ │     (NRF), based on the information associated with the AUSF.           │ │
│ └─────────────────────────────────────────────────────────────────────────┘ │
│ ┌─────────────────────────────────────────────────────────────────────────┐ │
│ │ Selecting a unified data management (UDM) function, in the communication│ │ 1422
│ │                 network, based on the second identifier.                │ │
│ └─────────────────────────────────────────────────────────────────────────┘ │
│ ┌─────────────────────────────────────────────────────────────────────────┐ │
│ │ Sending, to the UDM, a first request for a fourth identifier assoc'd    │ │ 1423
│ │                          with the AUSF.                                 │ │
│ └─────────────────────────────────────────────────────────────────────────┘ │
│ ┌─────────────────────────────────────────────────────────────────────────┐ │
│ │ Receiving, from the UDM, a first response including the fourth          │ │ 1424
│ │        identifier [and optionally a further second identifier].         │ │
│ └─────────────────────────────────────────────────────────────────────────┘ │
└─────────────────────────────────────────────────────────────────────────────┘
                                       ↓
┌─────────────────────────────────────────────────────────────────────────────┐
│   Obtaining the non-application-specific anchor security key (Kakma) from   │ 1430
│                                   the AUSF.                                 │
│ ┌─────────────────────────────────────────────────────────────────────────┐ │
│ │   Sending, to the determined AUSF, a request including the third        │ │ 1431
│ │                               identifier.                               │ │
│ └─────────────────────────────────────────────────────────────────────────┘ │
│ ┌─────────────────────────────────────────────────────────────────────────┐ │
│ │ Receiving, from the determined AUSF, a response including the non-      │ │ 1432
│ │ application-specific anchor security key (Kakma) and the second         │ │
│ │                              identifier.                                │ │
│ └─────────────────────────────────────────────────────────────────────────┘ │
│ ┌─────────────────────────────────────────────────────────────────────────┐ │
│ │ Sending, to the AUSF associated with the fourth identifier, a second    │ │ 1433
│ │ request comprising the second identifier or a further second identifier │ │
│ │                   related to the network subscription.                  │ │
│ └─────────────────────────────────────────────────────────────────────────┘ │
│ ┌─────────────────────────────────────────────────────────────────────────┐ │
│ │ Receiving, from the AUSF, a second response including the non-          │ │ 1434
│ │           application-specific anchor security key (Kakma).             │ │
│ └─────────────────────────────────────────────────────────────────────────┘ │
└─────────────────────────────────────────────────────────────────────────────┘
                                       ↓
┌─────────────────────────────────────────────────────────────────────────────┐
│ Generating the security key (Kaf) specific to the application session based │ 1440
│         on the non-application-specific anchor security key (Kakma).        │
└─────────────────────────────────────────────────────────────────────────────┘
```

*FIG. 14*

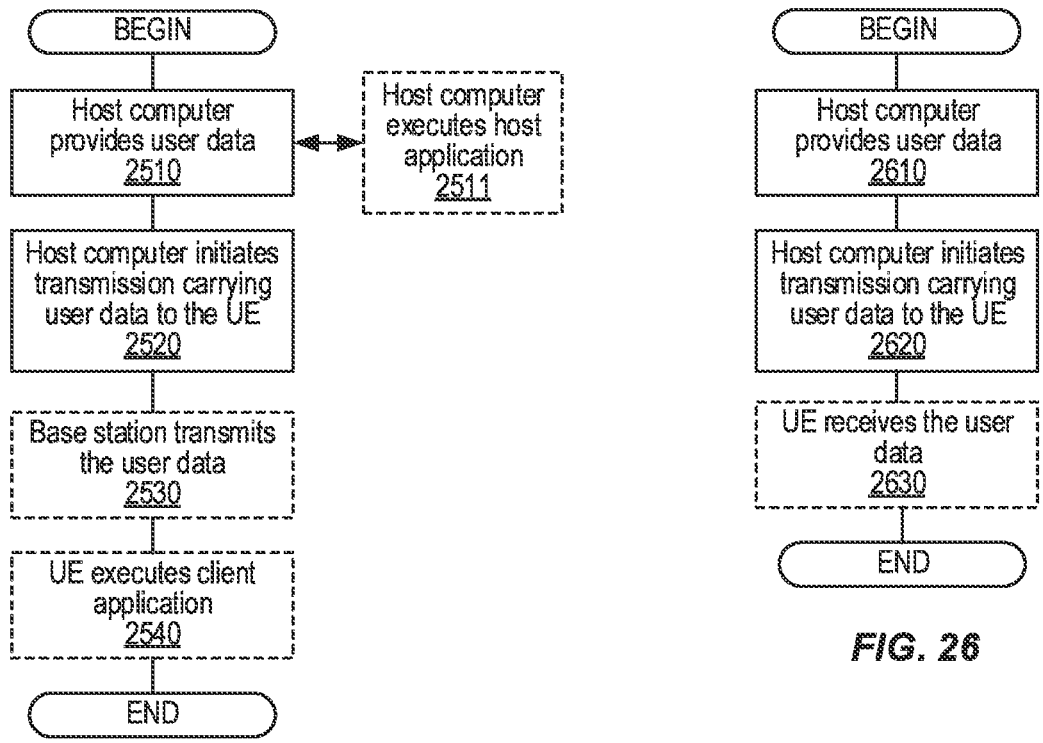
FIG. 25
FIG. 26
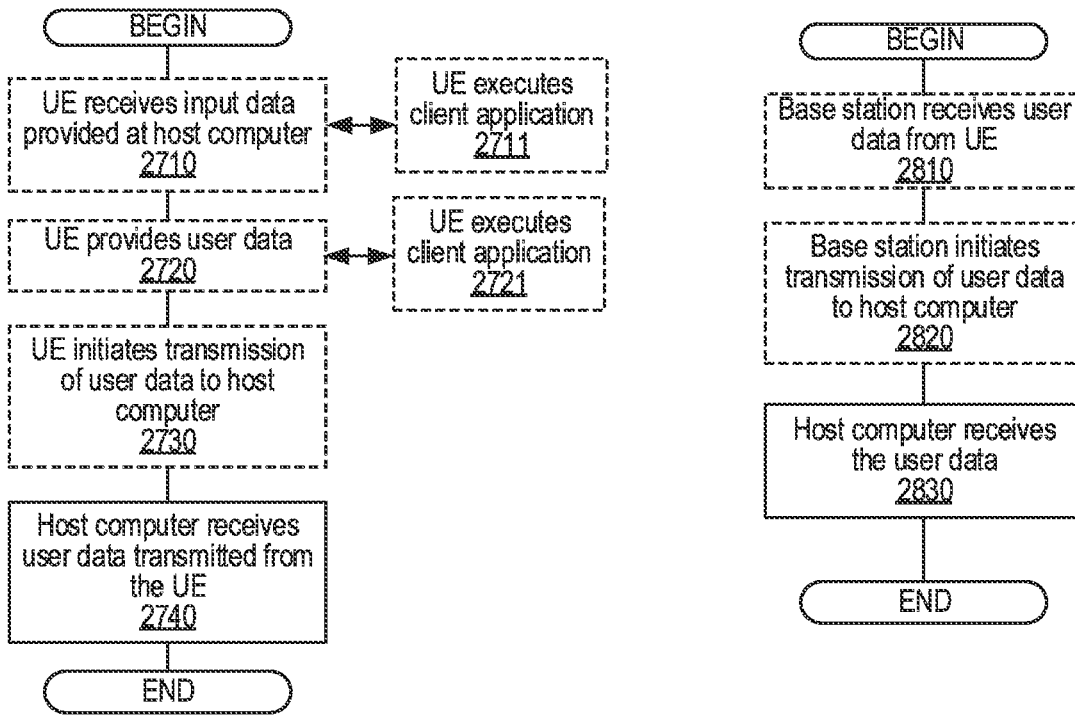
FIG. 27
FIG. 28

AUTHENTICATION SERVER FUNCTION SELECTION IN AUTHENTICATION AND KEY MANAGEMENT

PRIORITY CLAIM

This application is a continuation application of U.S. patent application Ser. No. 17/289,630, filed Apr. 28, 2021, granted as U.S. Pat. No. 11,399,281 on Jul. 26, 2022, which is a national stage application of International Patent Application No. PCT/IB2021/050564, filed Jan. 25, 2021, which claims priority to International Patent Application No. PCT/CN2020/076132, filed Feb. 21, 2020, the disclosure disclosures of which are hereby incorporated in their entirety by reference.

TECHNICAL FIELD

The present application relates generally to the field of communication networks and more specifically to techniques for authentication and key management in relation to secure use of applications in a communication network.

BACKGROUND

Long Term Evolution (LTE) is an umbrella term for so-called fourth generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall Example architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

In 3GPP, a study item on a new radio interface for a fifth generation (5G) cellular (e.g., wireless) network has been completed, and 3GPP is now standardizing this new radio interface, often abbreviated by NR (New Radio). FIG. 2 illustrates a high-level view of the 5G network architecture, consisting of a Next Generation RAN (NG-RAN) 299 and a 5G Core (5GC) 298. NG-RAN 299 can include a set of gNodeB's (gNBs) connected to the 5GC via one or more NG interfaces, such as gNBs 200, 250 connected via interfaces 202, 252, respectively. In addition, the gNBs can be connected to each other via one or more Xn interfaces, such as Xn interface 240 between gNBs 200 and 250. With respect the NR interface to UEs, each of the gNBs can support frequency division duplexing (FDD), time division duplexing (TDD), or a combination thereof.

NG-RAN 299 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some Example configurations, each gNB is connected to all 5GC nodes within an "AMF Region," which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 2 (and described in 3GPP TS 38.401 and 3GPP TR 38.801) include a central (or centralized) unit (CU or gNB-CU) and one or more distributed (or decentralized) units (DU or gNB-DU). For example, gNB 200 includes gNB-CU 210 and gNB-DUs 220 and 230. CUs (e.g., gNB-CU 210) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 222 and 232 shown in FIG. 3. The gNB-CU and connected gNB-DUs are only visible to other gNBs and the 5GC as a gNB. In other words, the F1 interface is not visible beyond gNB-CU.

FIG. 3 shows a high-level view of an Example 5G network architecture, including a Next Generation Radio Access Network (NG-RAN) 399 and a 5G Core (5GC) 398. As shown in the figure, NG-RAN 399 can include gNB s 310 (e.g., 310a,b) and ng-eNB s 320 (e.g., 320a,b) that are interconnected with each other via respective Xn interfaces. The gNBs and ng-eNBs are also connected via the NG interfaces to 5GC 398, more specifically to the AMF (Access and Mobility Management Function) 330 (e.g., AMFs 330a, b) via respective NG-C interfaces and to the UPF (User Plane Function) 340 (e.g., UPFs 340a,b) via respective NG-U interfaces. Moreover, the AMFs 340a,b can communicate with one or more policy control functions (PCFs, e.g., PCFs 350a,b) and network exposure functions (NEFs, e.g., NEFs 360a,b). The AMFs, UPFs, PCFs, and NEFs are described further below.

Each of the gNBs 310 can support the NR radio interface, including frequency division duplexing (FDD), time division duplexing (TDD), or a combination thereof. In contrast, each of ng-eNBs 320 supports the LTE radio interface but, unlike conventional LTE eNBs (such as shown in FIG. 1), connect to the 5GC via the NG interface.

Deployments based on different 3GPP architecture options (e.g., EPC-based or 5GC-based) and UEs with different capabilities (e.g., EPC NAS and 5GC NAS) may coexist at the same time within one network (e.g., PLMN). It is generally assumed that a UE that can support 5GC NAS procedures can also support EPC NAS procedures (e.g., as defined in 3GPP TS 24.301) to operate in legacy networks, such as when roaming. As such, the UE will use EPC NAS or 5GC NAS procedures depending on the core network (CN) by which it is served.

Another change in 5G networks (e.g., in 5GC) is that traditional peer-to-peer interfaces and protocols (e.g., those found in LTE/EPC networks) are modified by a so-called Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. In order to access a service, both the service name and the targeted service operation must be indicated. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

As discussed above, services can be deployed as part of a network function (NF) in the 5G SBA. This SBA model, which further adopts principles like modularity, reusability and self-containment of NFs, can enable deployments to take advantage of the latest virtualization and software technologies. FIG. 4 shows an Example non-roaming 5G reference architecture with service-based interfaces and various 3GPP-defined NFs within the Control Plane (CP). These include the following NFs, with additional details provided for those most relevant to the present disclosure:

Access and Mobility Management Function (AMF) with Namf interface—terminates the RAN CP interface and handles all mobility and connection management of UEs (similar to MME in EPC).

Session Management Function (SMF) with Nsmf interface—interacts with the decoupled user (or data) plane, including creating, updating, and removing Protocol Data Unit (PDU) sessions and managing session context with the User Plane Function (UPF), e.g., for event reporting.

User Plane Function (UPF) with Nupf interface—supports handling of user plane traffic based on the rules received from SMF, including packet inspection and different enforcement actions (e.g., event detection and reporting).

Policy Control Function (PCF) with Npcf interface—supports unified policy framework to govern the network behavior, e.g., via providing PCC rules to the SMF.

Network Exposure Function (NEF) with Nnef interface—acts as the entry point into operator's network, by securely exposing to AFs the network capabilities and events provided by 3GPP NFs and by providing ways for the AF to securely provide information to 3GPP network.

Network Repository Function (NRF) with Nnrf interface—provides service registration and discovery, enabling NFs to identify appropriate services available from other NFs.

Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g. compute, storage, communication) that provide the capabilities and characteristics of the network slice. The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

Application Function (AF) with Naf interface—interacts with the 3GPP CN to provision information to the network operator and to subscribe to certain events happening in operator's network.

The Unified Data Management (UDM) function shown in FIG. 4 is similar to the HSS in LTE/EPC networks discussed above. UDM supports Generation of 3GPP AKA authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

3GPP Rel-16 introduces a new feature called authentication and key management for applications (AKMA) that is based on 3GPP user credentials in 5G, including the IoT use case. More specifically, AKMA leverages the user's AKA (Authentication and Key Agreement) credentials to bootstrap security between the UE and an application function (AF), which allows the UE to securely exchange data with an application server. The AKMA architecture can be considered an evolution of GBA (Generic Bootstrapping Architecture) specified for 5GC in 3GPP Rel-15 and is further specified in 3GPP TS 33.535 (v.0.2.0 with ongoing revision).

In addition to the NEF, AUSF, and AF shown in FIG. 4 and described above, Rel-16 AKMA also utilizes an anchor function for authentication and key management for applications (AAnF). This function is shown in FIG. 4 with an Naanf interface. In general, AAnF interacts with AUSFs and maintains UE AKMA contexts to be used for subsequent bootstrapping requests, e.g., by application functions. In general, AAnF is similar to a bootstrapping server function (BSF) defined in Rel-15 GBA.

In this architecture, however, there can be various problems, issues, and/or difficulties related to synchronization of key material generated for a user by an AUSF and key material used by an AAnF to generate application-specific keys for the user's application sessions. Such problems, issues, and/or difficulties can prevent the establishment of secure communication between a user application (e.g., running on a UE) and a corresponding application function (e.g., server).

SUMMARY

Certain embodiments of the present disclosure provide specific improvements to secure communication between applications (e.g., clients) and application functions (e.g., servers), such as by facilitating solutions to overcome the Example problems summarized above and described in more detail below Example embodiments include methods (e.g., procedures) performed by a key management server (e.g., AAnF) in a communication network (e.g., 5GC). These embodiments can include receiving, from an application function, a request for a security key (Kaf) specific to an application session for a particular user. The request can include a representation of the following information associated with the particular user: a first identifier (KakmaID) of a non-application-specific anchor security key (Kakma), and a second identifier related to a network subscription. These Example methods can also include, based on the representation, determining an authentication server function (AUSF) that generated the non-application-specific anchor security key (Kakma).

In some embodiments, these example methods can also include obtaining the non-application-specific anchor security key (Kakma) from the determined AUSF, and generating the security key (Kaf) specific to the application session based on the non-application-specific anchor security key (Kakma). In some embodiments, these Example methods can also include sending, to the application function, the security key specific to the application session (Kaf).

In some embodiments, the representation can include a third identifier (B-ID) of a binding between the non-application-specific anchor security key (Kakma) and the AUSF that generated Kakma. The third identifier can include the representation of the first and second identifiers, and information associated with the AUSF. In various embodiments, the information associated with the AUSF can include one or more of the following: AUSF Group ID, AUSF ID, subscription permanent identifier (SUPI) range, fully qualified domain name (FQDN), IP address.

In such embodiments, the determining operations can include discovering an identity of the AUSF, via a network repository function (NRF), based on the information associated with the AUSF. Moreover, in such embodiments, the obtaining operations can include sending, to the determined AUSF, a request including the third identifier (e.g., B-TID); and receiving, from the determined AUSF, a response including the non-application-specific anchor security key (Kakma) and the second identifier.

In other embodiments, the representation of the first and second identifiers can include the first identifier (e.g., KakmaID) and the second identifier. For example, the second identifier can be any one of the following: HPLMN ID and user equipment routing identifier (RID); subscription concealed identifier (SUCI); subscription permanent identifier (SUPI); or generic public subscription identifier (GPSI). In a variant, the representation can include only the first identifier (e.g., KakmaID), which can include a representation of the second identifier.

In such embodiments, the determining operations can include selecting a unified data management (UDM) function, in the communication network, based on the second identifier; sending, to the UDM, a first request for a fourth identifier associated with the AUSF; and receiving, from the UDM, a first response including the fourth identifier. In some embodiments, the first response can also include a further second identifier related to the network subscription associated with the particular user. For example, the further second identifier can be a SUPI and the second identifier can be an identifier other than SUPI (e.g., GPSI, SUCI, HPLMN+RID).

In such embodiments, the obtaining operations can include sending, to the AUSF associated with the fourth identifier, a second request comprising the second identifier or a further second identifier related to the network subscription associated with the particular user; and receiving, from the AUSF, a second response including the non-application-specific anchor security key (Kakma). In some embodiments, either the second request or the second response can also include the second identifier. For example, if the second request includes the further second identifier (e.g., SUPI), the second response can include the second identifier (e.g., an identifier other than SUPI).

Example embodiments also include other methods (e.g., procedures) performed by a key management server (e.g., AAnF) in a communication network (e.g., 5GC). These example methods can include receiving, from an authentication server function (AUSF), the following information associated with a particular user: a non-application-specific anchor security key (Kakma); a first identifier (KakmaID) of the non-application-specific anchor security key; and a second identifier related to a network subscription. In some embodiments, the second identifier can be a subscription permanent identifier (SUPI).

These example methods can also include receiving, from an application function, a request for a security key (Kaf) specific to an application session for the particular user, wherein the request comprises a further identifier (KakmaID) of a non-application-specific anchor security key associated with the particular user. The request can include a further identifier (KakmaID) of a non-application-specific anchor security key associated with the particular user. These example methods can also include, based on a match between the first identifier and the further identifier (e.g., matching KakmaIDs), generating the security key (Kaf) specific to the application session based on the non-application-specific anchor security key (Kakma).

In some embodiments, the key management server can include a plurality of anchor function for authentication and key management for applications (AAnF) instances, each AAnF instance corresponding to a range of user equipment routing indicators (RIDs). In such embodiments, the request can also include a routing indicator (RID) associated with the particular user, and these example methods can also include selecting an AAnF instance based on the received RID, where generating the security key (Kaf) specific to the application session is performed by the selected AAnF instance.

In some embodiments, the key management server can be associated with one or more ranges of user equipment routing indicators (RIDs). In such embodiments, these example methods can also include registering an association between the key management server and the one or more ranges with a network repository function (NRF) in the communication network Example embodiments also include methods (e.g., procedures) performed by an application function in a communication network (e.g., 5GC). These example methods can include receiving, from a user equipment, a first request to establish an application session. The first request can include a representation of the following information associated with the particular user: a first identifier (KakmaID) of a non-application-specific anchor security key (Kakma), and a second identifier related to a network subscription. These example methods can also include sending, to an anchor function for authentication and key management for applications (AAnF) in the communication network, a second request for a security key (Kaf) specific to the application session. The second request can include the representation of the first and second identifiers.

These example methods can also include receiving, from the AAnF, the security key (Kaf) specific to the application session. In some embodiments, these example methods can also include establishing a secure application session with the user equipment based on the received security key (Kaf).

In some embodiments, the representation comprises a third identifier (B-ID) of a binding between the non-application-specific anchor security key (Kakma) and the AUSF that generated Kakma. In particular, the third identifier can include the representation of the first and second identifiers, and information associated with the AUSF. In various embodiments, the information associated with the AUSF can include one or more of the following: AUSF Group ID, AUSF ID, subscription permanent identifier (SUPI) range, fully qualified domain name (FQDN), IP address.

In other embodiments, the representation of the first and second identifiers can include the first identifier and the second identifier. For example, the second identifier can be any one of the following: HPLMN ID and user equipment routing identifier (RID); subscription concealed identifier (SUCI); subscription permanent identifier (SUPI); or generic public subscription identifier (GPSI). In a variant, the representation can include only the first identifier (e.g., KakmaID), which includes a representation of the second identifier.

Example embodiments also include methods (e.g., procedures) performed by an authentication server function (AUSF) in a communication network (e.g., 5GC). These Example methods can include receiving, from an anchor function for authentication and key management for applications (AAnF) in the communication network, a request for a non-application-specific anchor security key (Kakma) for a particular user. The request can include a first representation of the following: the first identifier (KakmaID) associated with the non-application-specific anchor security key (Kakma), and a second identifier related to a network subscription of the particular user. These example methods can also include sending, to the AAnF, a response including the requested non-application-specific anchor security key (Kakma).

In some embodiments, these example methods can include creating the non-application-specific anchor security key (Kakma) for the particular user, as well as the first identifier (KakmaID); and sending, to a unified data management (UDM) function in the communication network, a fourth identifier (AUSFID) associated with the AUSF and a second representation of at least the first identifier (KakmaID).

In some embodiments, the first representation and the second representation can include a third identifier (B-ID) of a binding between the non-application-specific anchor security key (Kakma) and the AUSF that generated Kakma. In particular, the third identifier can include the representation of the first and second identifiers, and information associated with the AUSF. In various embodiments, the information associated with the AUSF can include one or more of the following: AUSF Group ID, AUSF ID, subscription permanent identifier (SUPI) range, fully qualified domain name (FQDN), IP address. In such embodiments, the response can also include a subscription permanent identifier (SUPI) associated with the particular user.

In other embodiments, the first representation of the first and second identifiers can include the first identifier (e.g., KakmaID) and the second identifier, while the second representation can include only the first identifier. In such embodiments, the second identifier can be any one of the following: HPLMN ID and user equipment routing identifier (RID); subscription concealed identifier (SUCI); subscription permanent identifier (SUPI); or generic public subscription identifier (GPSI). In a variant, the first representation can include only the first identifier, which can include a representation of the second identifier.

Example embodiments also include other methods (e.g., procedures) performed by an authentication server function (AUSF) in a communication network (e.g., 5GC). These example methods can include creating a non-application-specific anchor security key (Kakma) for a particular user, wherein the non-application-specific anchor security key is associated with a first identifier (KakmaID). These example methods can also include, based on a second identifier related to a network subscription of the particular user, selecting an anchor function for authentication and key management for applications (AAnF), in the communication network, associated with the particular user. In some embodiments, these example methods can also include sending, to the identified AAnF, the following information: the non-application-specific anchor security key (Kakma) for the particular user, the first identifier (KakmaID), and the second identifier related to the network subscription of the particular user. In various embodiments, the second identifier can be a subscription permanent identifier (SUPI) associated with the particular user.

Example embodiments also include methods (e.g., procedures) performed by a unified data management (UDM) function in a communication network (e.g., 5GC). These example methods can include receive, from an authentication server function (AUSF) in the communication network, a fourth identifier (AUSFID) associated with the AUSF and a first identifier (KakmaID) associated with a non-application-specific anchor security key (Kakma) for a particular user. These example methods can also include receiving, from an anchor function for authentication and key management for applications (AAnF) in the communication network, a request for the fourth identifier. These example methods can also include sending, to the AAnF, a response comprising the fourth identifier.

In some embodiments, the request can include the first identifier (KakmaID) and the response can include a second identifier related to a network subscription associated with the particular user. In some of these embodiments, the first identifier can include a representation of the second identifier. In other of these embodiments, the request can include a further second identifier related to the network subscription associated with the particular user. In such embodiments, these example methods can also include determining the second identifier based on the further second identifier. For example, the second identifier can be a subscription permanent identifier (SUPI), and the further second identifier is an identifier other than SUPI (e.g., SUCI, GPSI).

In various embodiments, the AUSF can include a plurality of AUSF instances, each AUSF instance corresponding to a range of identifiers associated with network subscriptions (e.g., RIDs, SUPIs, etc.). In such embodiments, these example methods can also include selecting a particular AUSF instance based on the second identifier. In such embodiments, the fourth identifier can correspond to the selected AUSF instance.

Example embodiments also include key management servers (e.g., AAnF), application functions, authentication server functions (AUSF), and unified data management (UDM) functions in a communication network (e.g., 5GC) that are configured to perform operations (e.g., using processing circuitry) corresponding to any of the example methods described herein.

Example embodiments also include non-transitory, computer-readable media storing computer-executable instructions that, when executed by processing circuitry associated with such key management servers, application functions, AUSF, and UDM functions, configure the same to perform operations corresponding to any of the example methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIGS. 14-15 illustrate various example methods (e.g., procedures) performed by an authentication and key management server (e.g., AAnF) in a communication network (e.g., 5GC), according to various example embodiments of the present disclosure.

FIGS. 25-28 are flow diagrams of example methods and/or procedures for transmission and/or reception of user data, according to various example embodiments of the present disclosure.

DETAILED DESCRIPTION

Figure 1:
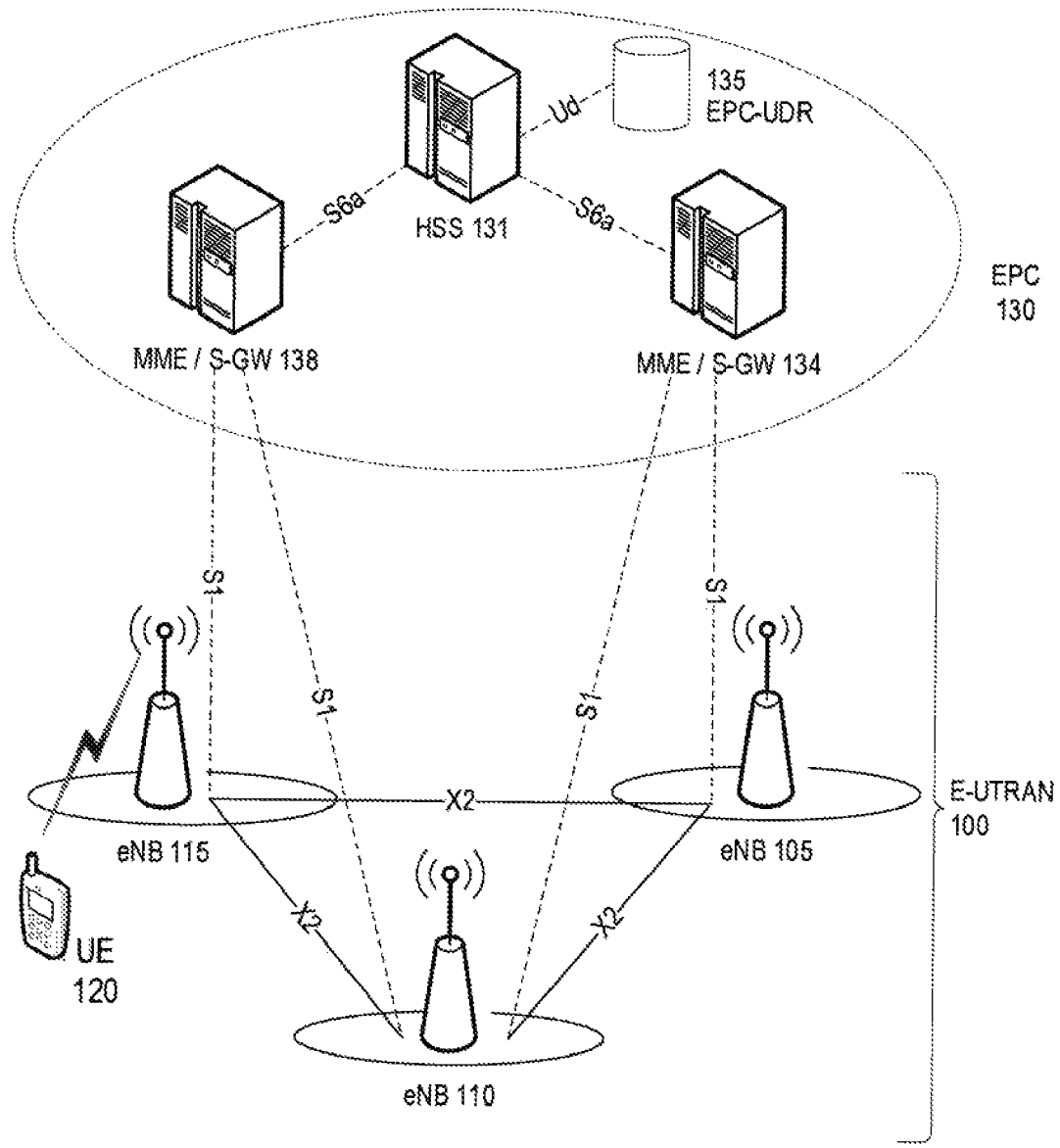
FIG. 1 is a high-level block diagram of an example architecture of the Long-Term Evolution (LTE) Evolved UTRAN (E-UTRAN) and Evolved Packet Core (EPC) network, as standardized by 3GPP.
Figure 2:
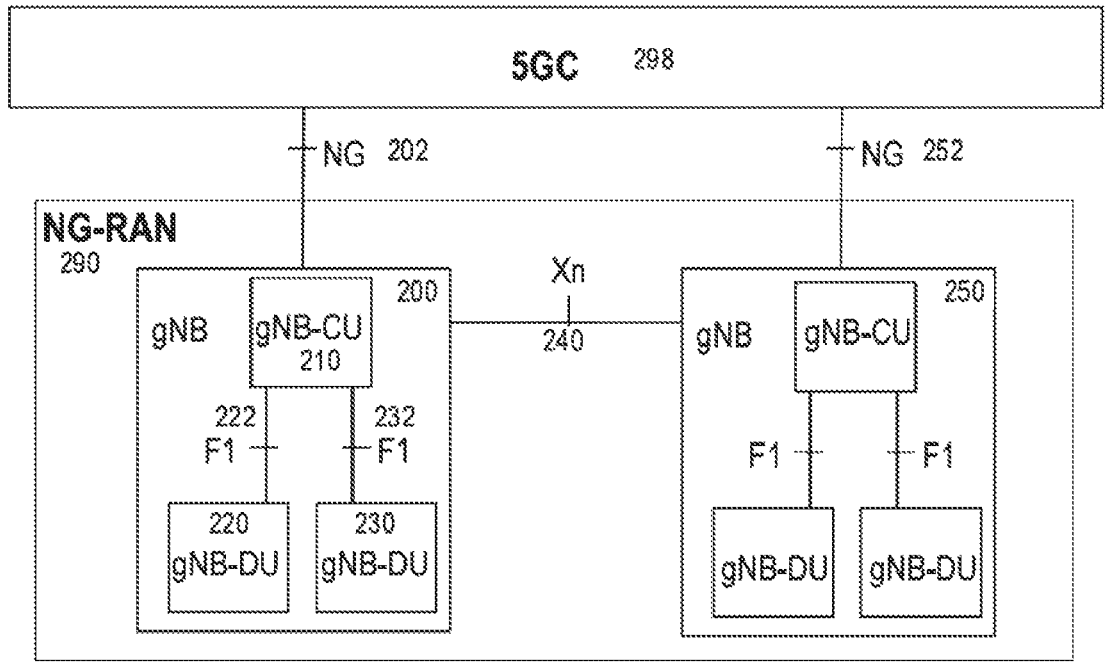
FIGS. 2-3 illustrate two different high-level views of a 5G network architecture.
Figure 3:
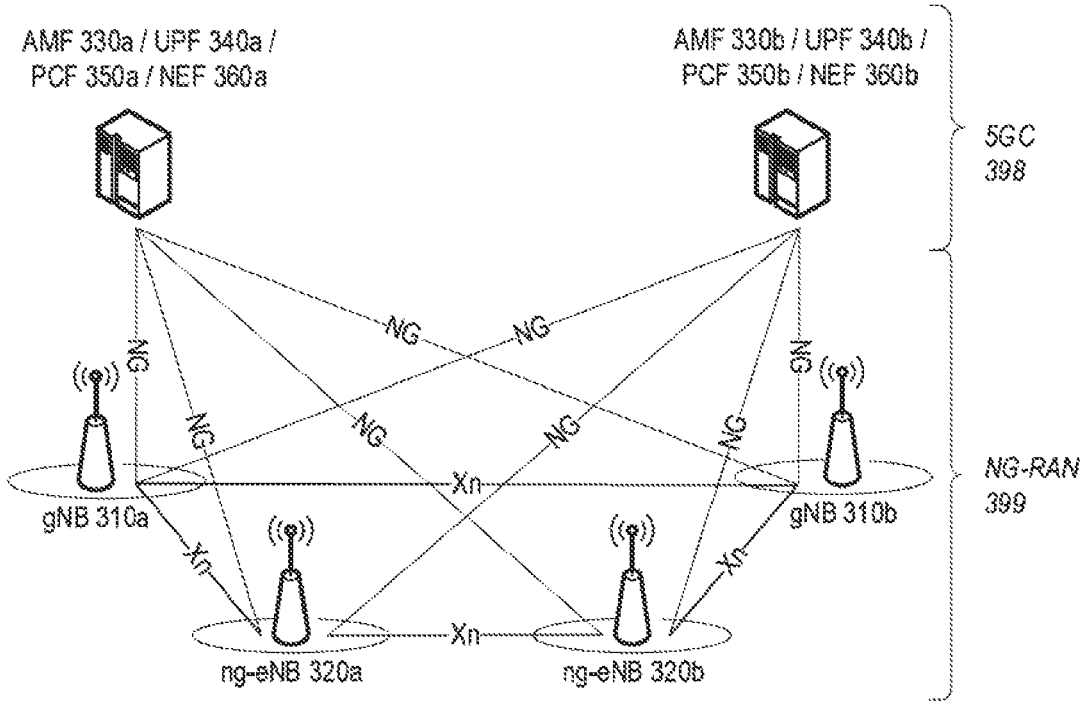
Figure 4:
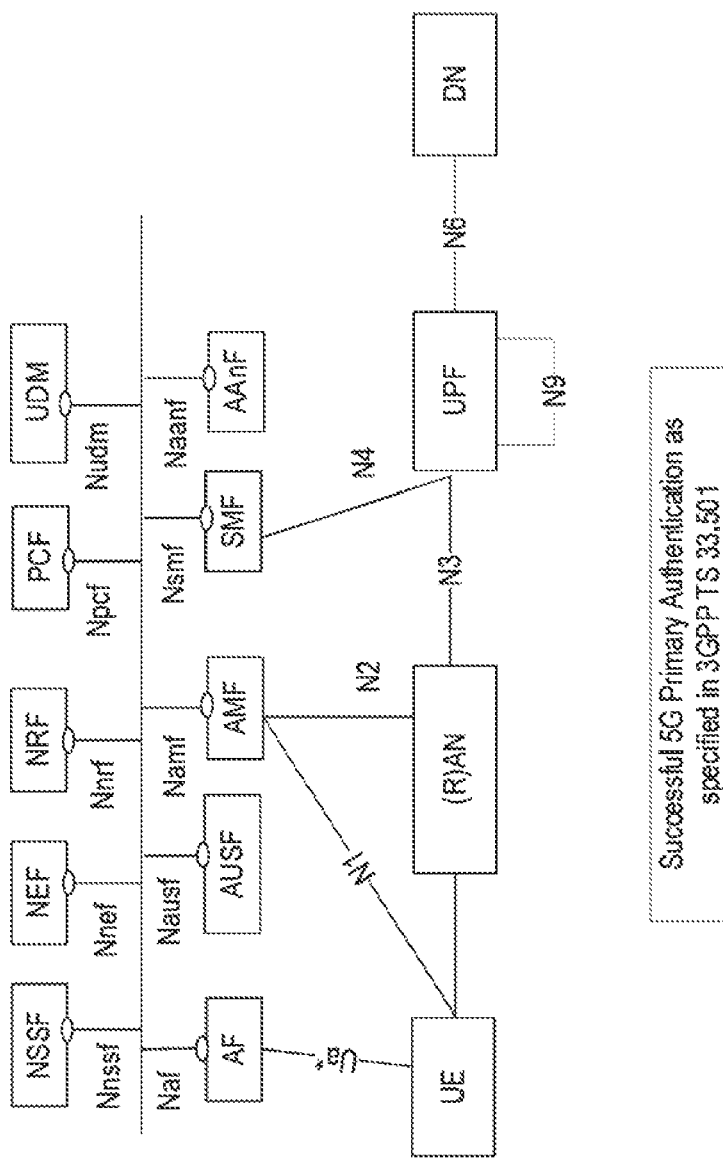
FIG. 4 shows an example non-roaming 5G reference architectures with service-based interfaces and various network functions (NFs) in a core network, as further described in 3GPP TS 23.501 (v16.1.0).

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided as examples to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

In the present disclosure, the term "service" is used generally to refer to a set of data, associated with one or more applications, that is to be transferred via a network with certain specific delivery requirements that need to be fulfilled in order to make the applications successful. In the present disclosure, the term "component" is used generally to refer to any component needed for the delivery of the service. Examples of component are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation, storage. In general, each component can have a "manager", a term used generally to refer to an entity that can collect historical information about utilization of resources as well as provide information about the current and the predicted future availability of resources associated with that component (e.g., a RAN manager).

As briefly mentioned above, in the Rel-16 AKMA architecture, there can be various problems, issues, and/or difficulties related to synchronization of key material generated for a user by an AUSF and key material used by an AAnF to generate application-specific keys for the user's application sessions. Such problems, issues, and/or difficulties can prevent the establishment of secure communication between a user application (e.g., running on a UE) and a corresponding application function (e.g., server). This discussed in more detail below.

In general, AKMA reuses the result of 5G primary authentication procedure used to authenticate a UE during network registration (also referred to as "implicit bootstrapping"). In this procedure, AUSF is responsible of generation and storage of key material. In particular, the key hierarchy in AKMA includes the following, which is further illustrated in FIG. 5:

Kausf: root key, output of primary authentication procedure and stored in UE (i.e., mobile equipment, ME, part) and AUSF. Additionally, AUSF can report the result and the particular AUSF instance that generates Kausf as output of the primary authentication result in UDM, as defined in TS33.501.

Kakma: anchor key derived by ME and AUSF from Kausf and used by AAnF for further AKMA key material generation. The key identifier KakmaID identifies Kakma.

Kaf: application key derived by ME and AAnF from $K_{AKMA}$ and used by UE and the Application to securely exchange application data.

Figure 6:
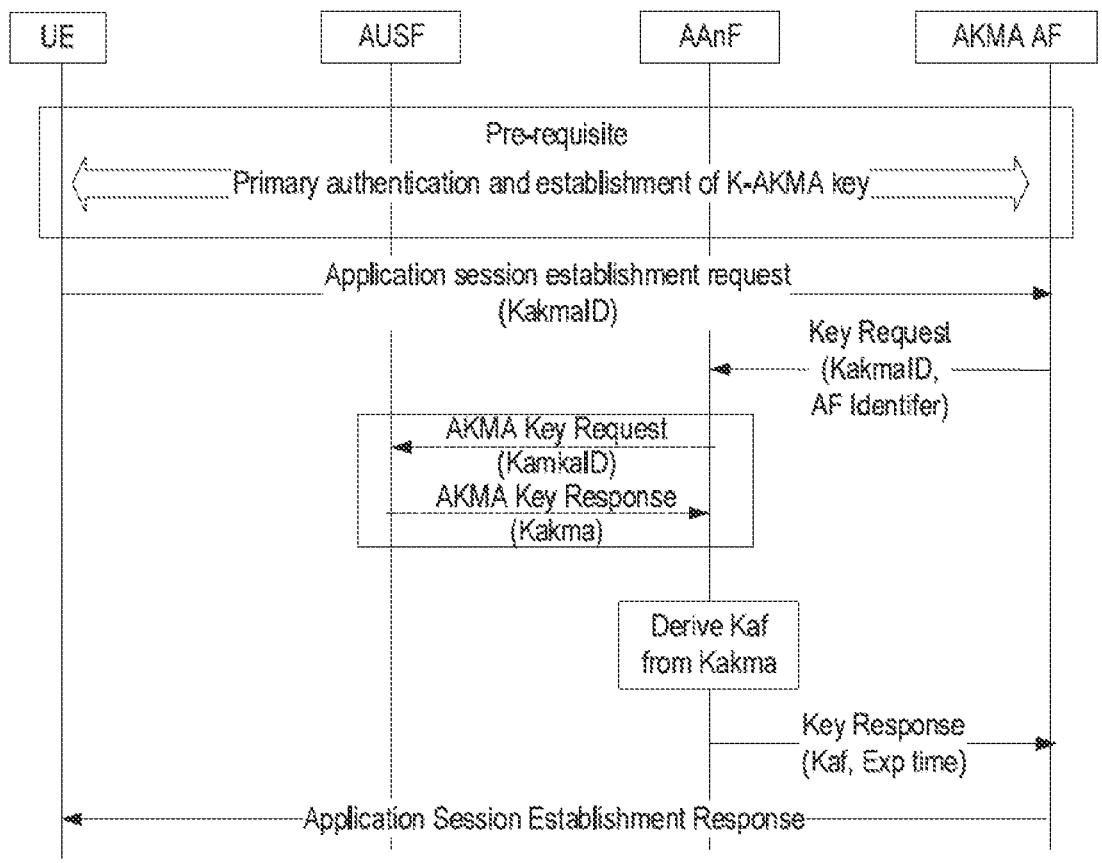
FIG. 6 is a flow diagram illustrating an example procedure for setting up a secure application session between a user equipment (UE) and an application function (AF).

FIG. 6 is a flow diagram illustrating an example procedure for setting up a secure application session between a UE and an AF, based on the key hierarchy listed above. Initially, the UE and AUSF perform primary authentication and establish the Kakma key, which is stored in both UE and AUSF. Subsequently, the UE sends an application session establishment request to the AF, including KakmaID. The AF then sends the received KakmaID together with an AF identifier to AAnF, which responds with the Kakma corresponding to the provided KakmaID. The AAnF derives Kaf from Kakma and provides Kaf to the AF together with an expiration time of Kaf. The AF can then use the received Kaf to establish a secure application session with the UE.

Figure 7:
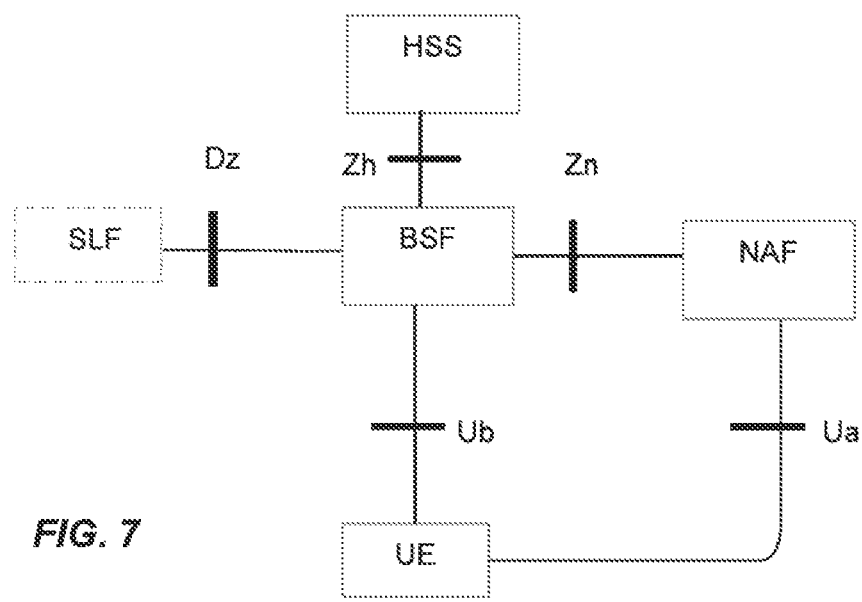
FIG. 7 shows an example Generic Bootstrapping Architecture (GBA) for authentication and key agreement (AKA) for application security.

As briefly mentioned above, Generic Bootstrapping Architecture (GBA) was introduced in 3GPP Rel-15 (e.g., 3GPP TS 33.220 v15.4.0) to bootstrap authentication and key agreement (AKA) for application security. Put differently, GBA enables AFs in the network and on the user side to establish shared keys. FIG. 7 shows an example GBA for AKA according to 3GPP specifications.

In GBA, mutual authentication is performed between the UE and the BSF, with the bootstrapping key material also being derived between UE and BSF. The BSF also generates a B-TID (Bootstrapping Transaction Identifier) for each bootstrapping transaction that derives GBA key material. The bootstrapped GBA key material is then used for secure access by the UE to network application functions (NAFs).

When the UE initiates communication with an AF, it includes B-TID in the message. The AF then requests an application-specific key from BSF using B-TID as input. BSF locates GBA key material corresponding to B-TID, derives the application-specific key, and provides it to the AF. Secured communication between UE and AF is then established based on the application-specific key.

To enable a NF to discover and select a proper instance of AUSF or UDM to handle the traffic, 3GPP TS 23.501 defines input parameters that can be used for discovery of AUSF or UDM (e.g., via NRF). Relevant excerpts from 3GPP TS 23.501 are given below. The following abbreviations of UE-related identifiers are used in the except:
- subscription permanent identifier (SUPI),
- subscription concealed identifier (SUCI), and
- generic public subscription identifier (GPSI).

\*\*\*Begin excerpt from 3GPP TS 23.501\*\*\*
The AUSF selection function in AUSF NF consumers or in SCP should consider one of the following factors when available:
1. Home network identifier (e.g., MNC and MCC) of SUCI/SUPI (by an NF consumer in the Serving PLMN) and Routing Indicator.
    NOTE 1: The UE provides the Routing Indicator to the AMF as part of the SUCI as defined in TS 23.003 [19] during initial registration. The AMF can provide the UE's Routing Indicator to other AMFs as described in TS 23.502 [3].
    When the UE's Routing Indicator is set to its default value as defined in TS 23.003 [19], the AUSF NF consumer can select any AUSF instance within the home network for the UE.
2. AUSF Group ID the UE's SUPI belongs to.
    NOTE 2: The AMF can infer the AUSF Group ID the UE's SUPI belongs to, based on the results of AUSF discovery procedures with NRF. The AMF provides the AUSF Group ID the SUPI belongs to other AMFs as described in TS 23.502 [3].
3. SUPI; e.g. the AMF selects an AUSF instance based on the SUPI range the UE's SUPI belongs to or based on the results of a discovery procedure with NRF using the UE's SUPI as input for AUSF discovery.

The UDM selection functionality in NF consumer or in SCP should consider one of the following factors:
1. Home network identifier (e.g. MNC and MCC) of SUCI/SUPI and UE's Routing Indicator.
    NOTE 1: The UE provides the Routing Indicator to the AMF as part of the SUCI as defined in TS 23.003 [19] during initial registration. The AMF provides the UE's Routing Indicator to other NF consumers (of UDM) as described in TS 23.502 [3].
    When the UE's Routing Indicator is set to its default value as defined in TS 23.003 [19], the UDM NF consumer can select any UDM instance within the home network of the SUCI/SUPI.
2. UDM Group ID of the UE's SUPI.
    NOTE 2: The AMF can infer the UDM Group ID the UE's SUPI belongs to, based on the results of UDM discovery procedures with NRF. The AMF provides the UDM Group ID the SUPI belongs to other UDM NF consumers as described in 3GPP TS 23.502.
3. SUPI—the UDM NF consumer selects a UDM instance based on the SUPI range the UE's SUPI belongs to or based on the results of a discovery procedure with NRF using the UE's SUPI as input for UDM discovery.
4. GPSI or External Group ID—UDM NF consumers which manage network signalling not based on SUPI/SUCI (e.g. the NEF) select a UDM instance based on the GPSI or External Group ID range the UE's GPSI or External Group ID belongs to or based on the results of a discovery procedure with NRF using the UE's GPSI or External Group ID as input for UDM discovery.

\*\*\*End excerpt from 3GPP TS 23.501\*\*\*

Figure 8:
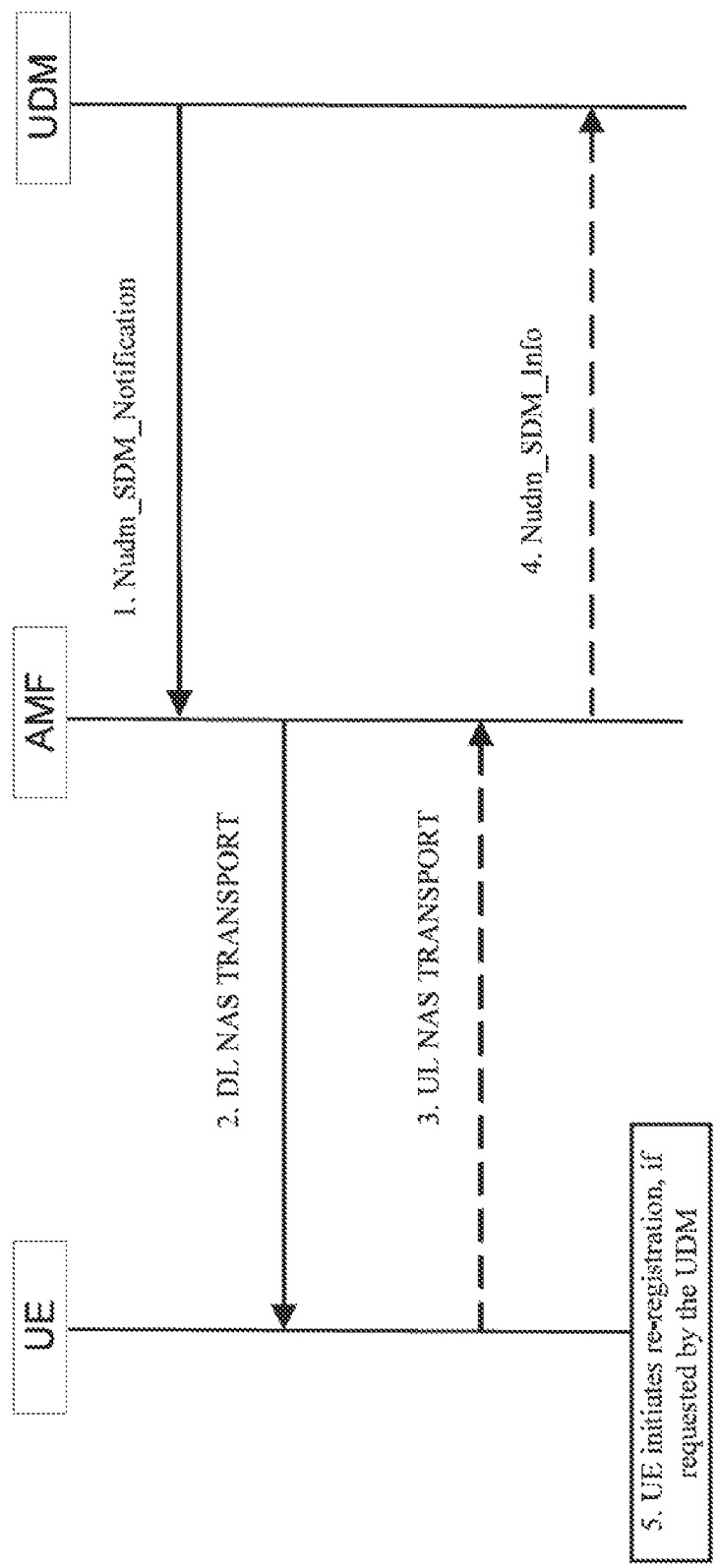
FIG. 8 is a flow diagram illustrating an example procedure for delivering UE parameters updates (UPU) from a Unified Data Management (UDM) function in a 5GC.

In addition, 3GPP TS 23.502 defines a procedure for delivery of UE Parameters Update Data from the UDM to the UE via non-access-stratum (NAS) signalling after the UE has successfully registered to the 5GC. FIG. 8 is a flow diagram illustrating an example procedure for delivering UE parameters updates (UPU) from a UDM in a 5GC. The UDM Update Data that the UDM delivers to the UE may contain any of the following:
- one or more UE parameters including:
    - updated Default Configured NSSAI (final consumer of the parameter is the ME).
    - updated Routing Indicator Data (final consumer of the parameter is the USIM).
- a "UE acknowledgement requested" indication.
- a "re-registration requested" indication.

Also, a similar feature called "steering of roaming security mechanism" is defined in 3GPP TS 33.501 to support delivery of a steering information list to a UE from the UE's HPLMN.

Figure 5:
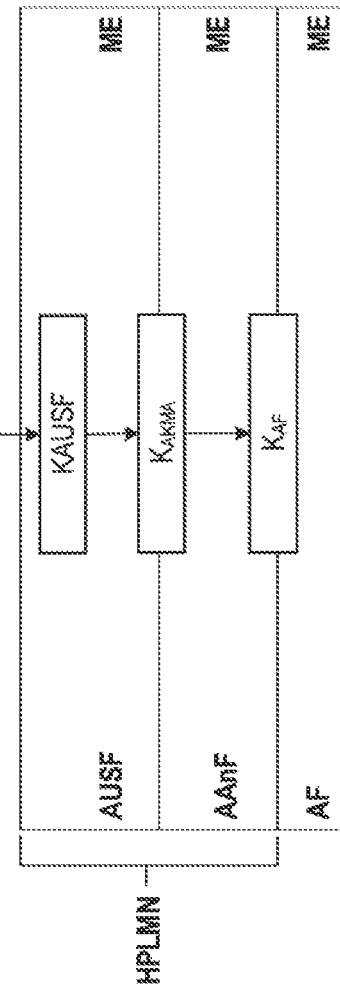
FIG. 5 is a block diagram illustrating an example authentication and key management for applications (AKMA) key hierarchy.

Returning to the key hierarchy shown in FIG. 5, 3GPP TS 33.501 defines the generation and storage of Kausf in AUSF and UE after each primary authentication procedure. However, 3GPP TS 33.501 does not specify when the AUSF and/or the UE deletes or overwrites the Kausf, which is the implicitly agreed root key used by UE and AUSF to derive Kakma. As such, it is possible that different AUSF instances are used to authenticate the user over time. In particular, different AUSF instances may generate and store Kausf for respective authentications, but only one AUSF instance holds the latest Kausf for a given UE (which also holds the latest Kausf). This can result in various problems, issues, and/or difficulties.

As one example, Kakma and KakmaID are generated separately in UE and AUSF based on Kausf. As such, the UE does not obtain the identity of a particular AUSF (e.g., AUSF ID) that generates and stores Kakma during primary authentication, so KakmaID generated by UE cannot contain any reference to the AUSF ID. Accordingly, even if the UE provides KakmaID when the UE attempts to establish a secure application session with the AF (e.g., in FIG. 6), the AF (or more specifically, an AAnF associated with the AF) is not aware of the proper AUSF instance that generated and holds Kakma associated with the received KakmaID. Note that even if AAnF is collocated with AUSF, it is still unclear how the AF, and/or intermediate NEF deployed between AF and AAnF, can discover and select the integrated AUSF/AAnF based on KakmaID received from the UE.

As another example, Kakma is generated in AUSF and obtained by AAnF to derive Kaf. There could be multiple Kausf generated for the UE by different AUSF instances during different primary authentication procedures. Furthermore, each of these AUSF instances could generate and store a different Kakma/KakmaID for the UE based on the corresponding Kausf. Without any specification of deletion/removal procedures, different Kakma/KakmaID can be stored in different AUSF instances, with only one corresponding to the Kakma/KakmaID stored at the UE.

In general, there is a need for an agreement between UE and network to use the latest Kakma. However, during some exceptional cases, the key materials stored in UE and in the network can be unsynchronized. For example, a new version of Kausf and Kakma can be generated and stored in UE, but the new version of Kausf and Kakma have not yet been generated and stored in the network. In such case, KakmaID received from UE during AKMA session setup could refer to a Kakma which does not yet exist in the network side yet.

Example embodiments of the present disclosure address these and other problems, issues, and/or difficulties by providing techniques that facilitate the selection of the AUSF instance storing Kakma referenced by the KakmaID provided by the UE in the initiation of an AKMA procedure with an AF.

Some embodiments of the present disclosure can leverage UDM discovery and selection techniques used in primary authentication based on an identifier related to a network subscription associated with the UE. For example, the identifier can be any relevant identifier available in the UE, including HPLMN ID plus UE routing indicator (R-ID), SUCI, SUPI, or GPSI. The UE can provide the identifier to the AF as part of, or separate from, KakmaID in a request to establish an application session. Once a suitable UDM that can manage the UE request is located based on the identifier, the AAnF (or NEF/AF) obtains the identity of the AUSF storing the latest Kakma from the UDM via a new service operation, e.g., Nudm_UEAuthentication_ResultStatus. The AAnF can then obtain the latest Kakma from the identified AUSF, and generate Kaf based on the obtained Kakma.

Other embodiments of the present disclosure can leverage existing UE parameters update (UPU) techniques to deliver explicit binding information between Kakma and the AUSF ID that holds Kausf/Kakma that the UE is currently using. Even though AKMA key material is implicitly and independently generated in UE and network side, the UE and network can have an explicit binding procedure to agree on (Kausf, Kakma) version synchronization and reference to AUSF ID.

More specifically, the UE can obtain the binding information from the UDM and provide it to AF in a request to establish an application session. The AAnF can then use the binding information to locate the associated AUSF ID (i.e., the AUSF storing the latest Kakma for the UE), in a similar manner as the BSF discovery procedure for GBA. Note that if AAnF is collocated with AUSF, the binding information is also associated with the AAnF, which is similar to binding of BSF in GBA.

Other embodiments of the present disclosure can leverage registration procedures in NRF to register the AAnF according to a range of routing identifiers (RIDs), which the AUSF can later discover via NRF. When the AUSF creates Kakma for a particular UE corresponding to the registered RIDs, the AUSF can push the Kakma/KakmaID to the AAnF previously discovered. In this manner, the AAnF already has the Kakma needed to generate Kaf when requested by an AF.

Figure 9:
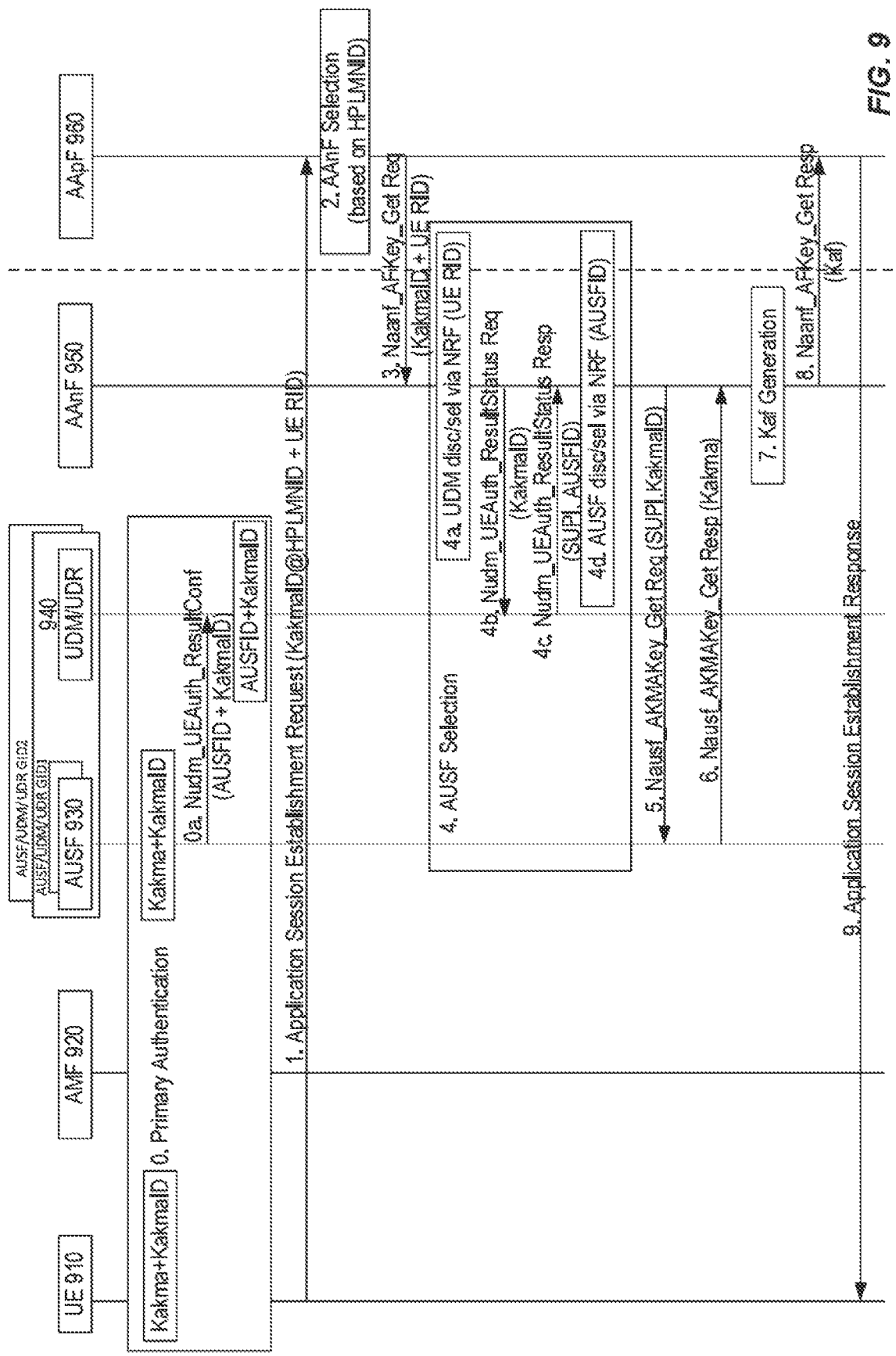
FIGS. 9-13 are flow diagram of various example procedures involving authentication server function (AUSF) selection during application session establishment, according to various example embodiments of the present disclosure.
Figure 10:
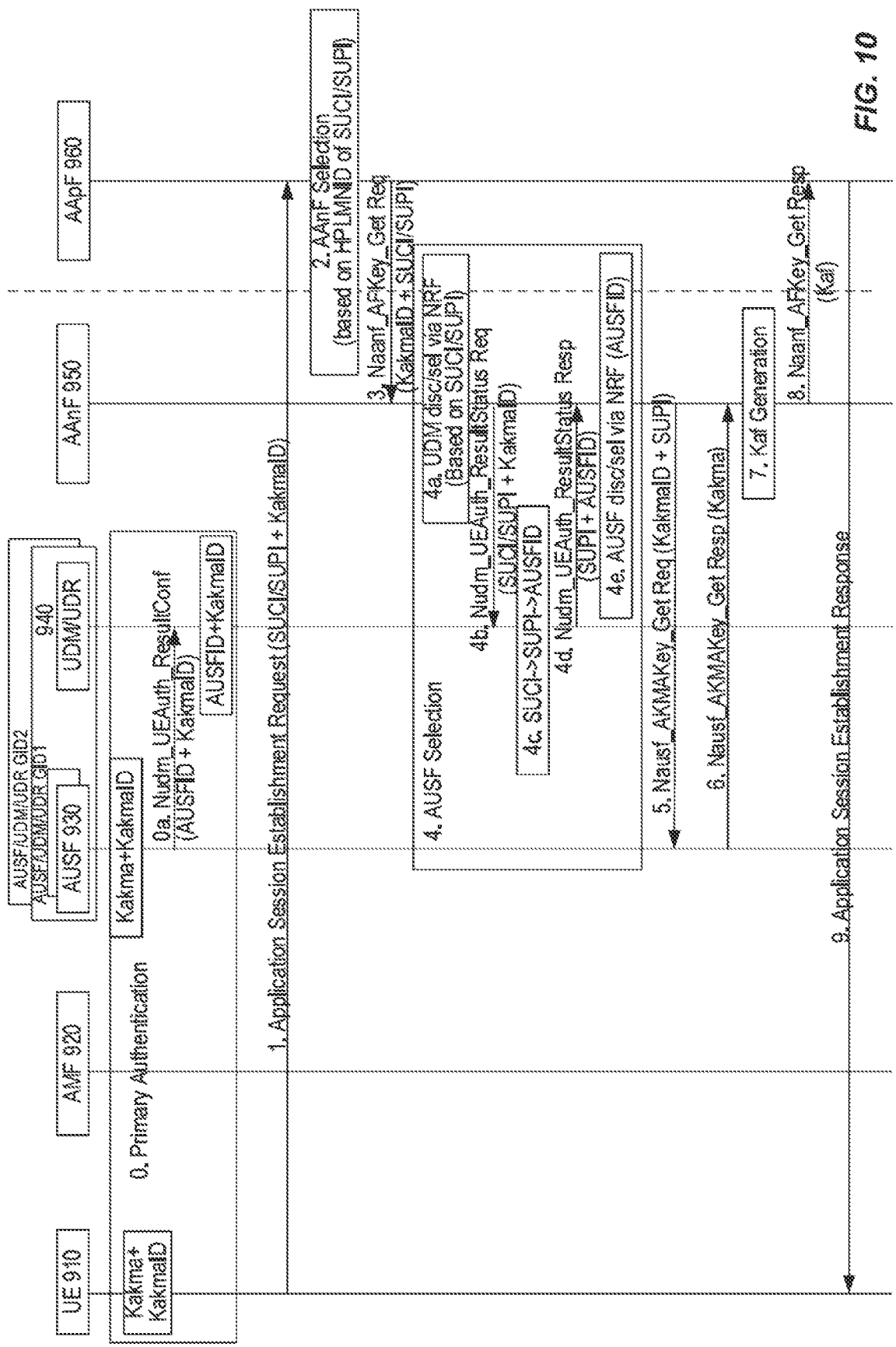
Figure 11:
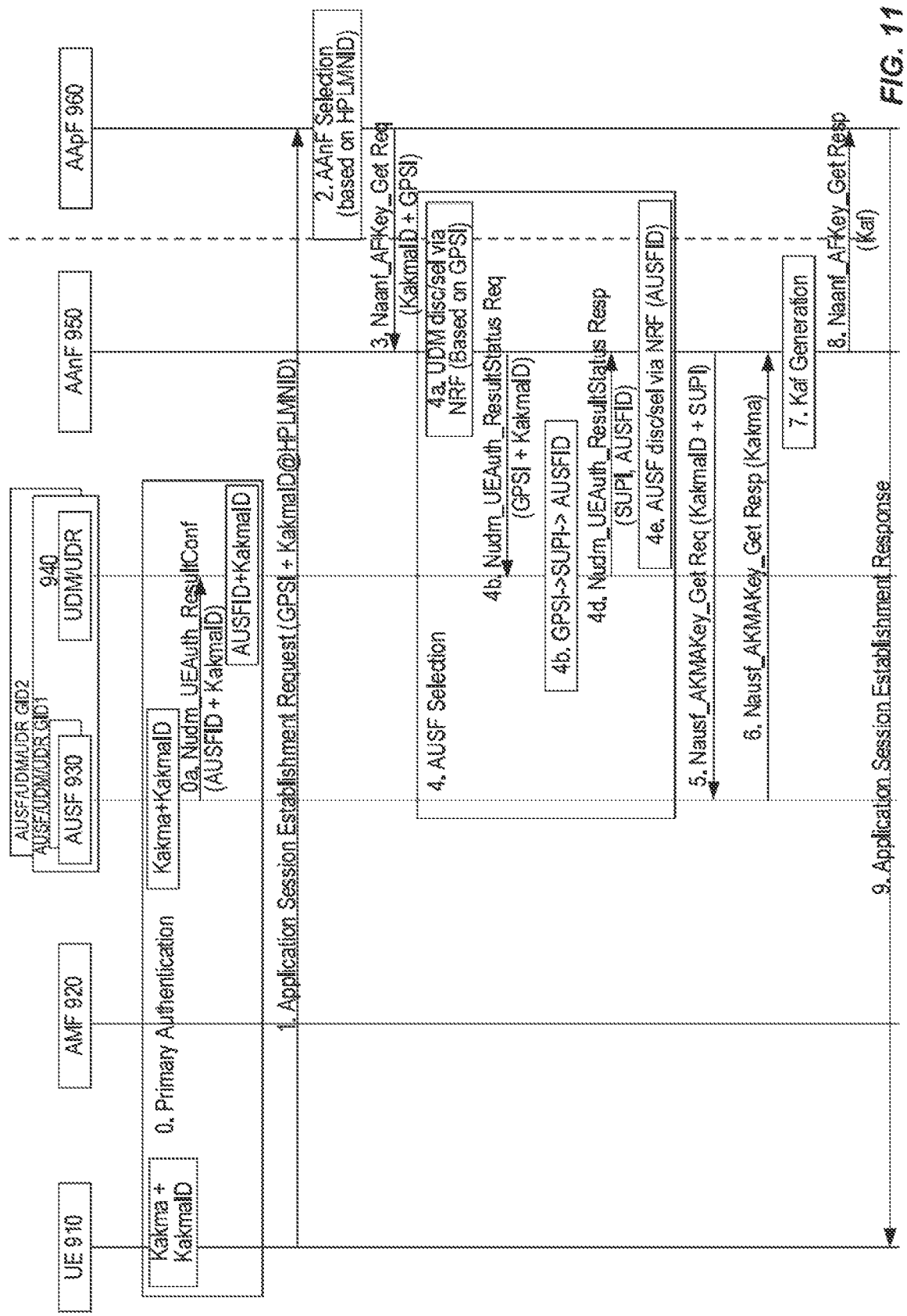

FIGS. 9-11 are flow diagram of various example procedures involving authentication support function (AUSF) selection during application session establishment, according to various example embodiments of the present disclosure. In particular, embodiments illustrated in FIGS. 9-11 leverage UDM discovery and selection techniques used in primary authentication based on an identifier related to a network subscription associated with the UE. In particular, FIGS. 9-11 illustrate procedures based on HPLMN ID plus UE routing indicator, SUCI/SUPI, and GPSI, respectively.

Each of FIGS. 9-11 involves various messages and operations involving a UE 910, AMF 920, one or more instances of AUSF 930 (e.g., 930*a*, 930*b*, etc.), UDM/UDR 940, one or more instances of AAnF 950 (e.g., 950*a*, 950*b*, etc.), and an AApF (or AF) 960. For the sake of brevity, these entities will be referred to without reference numbers in the following description. In addition, although FIGS. 9-11 show numbered operations, these numbers are used to facilitate description of the procedures and not to require or imply a particular order of the operations. In other words, the operations shown in FIGS. 9-11 can be performed in a different order than shown, and can be combined and/or divided into operations different than the one shown.

In FIG. 9 operation 0, the UE runs a primary authentication with the network. Kakma and KakmaID are generated and stored in UE and AUSF. The AUSF calls the existing service operation Nudm_UEAuthentication_ResultConfirmation to inform UDM about the authentication result including SUPI, AUSF ID, Serving Network Name, authentication Type, and timestamp information. Additionally, AUSF provides KakmaID generated during the primary authentication. UDM then stores all information together.

In operation 1, the UE initiates an application session setup procedure with the AF. The UE includes KakmaID and the home network identifier (HPLMN ID, e.g. mobile network code/mobile country code, MNC/MCC) and the UE's RID. The HPLMN ID and the RID can be included within the KakmaID or can be included as a separate identifier in the message. In operations 2-3, the AF selects AAnF based on HPLM ID and sends the selected AAnF a request for Kaf to use in the application session with the UE. The request includes AF ID, KakmaID, and HPLMN ID+RID.

Operation 4 involves AUSF discovery and selection by the AAnF. In operation 4a, the AAnF discovers and selects UDM based on the RID received from the AF. In operation 4b, the AAnF calls a new service operation Nudm_UEAuthentication_ResultStatus to send a request to the selected UDM with KakmaID included with the request. UDM uses KakmaID to discover and select the AUSF instance based on the information stored during operation 0. In operation 4c, the UDM returns the SUPI and AUSF ID to the requesting AAnF. In operation 4d, the AAnF discovers and selects AUSF based on the AUSF ID received from the UDM.

In operation 5, the AAnF calls a service operation Nausf_AKMAKey_Get to send a request to the selected AUSF for Kakma, with SUPI and KakmaID included in the request. In operation 6, the AUSF returns Kakma back to AAnF. In operations 7-8, AAnF generates Kaf based on Kakma received from AUSF and provides Kaf to the AF. In operation 9, the AF establishes the secure application session with the UE based on Kaf received in operation 8.

FIG. 10 shows similar operations to FIG. 9, but based on a different identifier, i.e., SUCI or SUPI rather than HPLMN ID+RID. Operation 0 is identical to operation 0 in FIG. 9. In operation 1, the UE initiates an application session setup procedure with the AF. The UE includes KakmaID and the SUCI or SUPI. The SUCI or SUPI can be included within the KakmaID or can be included as a separate identifier in the message. In operations 2-3, the AF selects AAnF based on HPLM ID associated with the SUCI or SUPI and sends the selected AAnF a request for Kaf to use in the application session with the UE. The request includes AF ID, KakmaID, and SUCI or SUPI.

Operation 4 involves AUSF discovery and selection by the AAnF. In operation 4a, the AAnF discovers and selects UDM based on SUCI or SUPI received from the AF. In operation 4b, the AAnF calls a new service operation Nudm_UEAuthentication_ResultStatus to send a request to the selected UDM with KakmaID and SUCI or SUPI included with the request. In operation 4c, UDM uses SUCI or SUPI to select the AUSF instance based on the information stored during operation 0. UDM verifies that KakmaID received from the AAnF is included in the stored authentication context for the UE. In operation 4d, the UDM returns the SUPI and AUSF ID to the requesting AAnF. In operation 4e, the AAnF discovers and selects AUSF based on the AUSF ID received from the UDM. Operations 5-9 are identical to operations 5-9 in FIG. 9.

FIG. 11 shows similar operations to FIGS. 9-10, but based on a different identifier, i.e., GPSI rather than HPLMN ID+RID, SUCI, or SUPI. Operation 0 is identical to operation 0 shown in FIGS. 9-10. In operation 1, the UE initiates an application session setup procedure with the AF. The UE includes KakmaID and GPSI. The GPSI can be included within the KakmaID or can be included as a separate identifier in the message. In operations 2-3, the AF selects AAnF based on HPLM ID associated with the GPSI and sends the selected AAnF a request for Kaf to use in the application session with the UE. The request includes AF ID, KakmaID, and GPSI.

Operation 4 involves AUSF discovery and selection by the AAnF. In operation 4a, the AAnF discovers and selects UDM based on GPSI received from the AF. In operation 4b, the AAnF calls a new service operation Nudm_UEAuthentication_ResultStatus to send a request to the selected UDM with KakmaID and GPSI included with the request. In operation 4c, UDM translates the received GPSI to the corresponding SUPI and uses SUPI to select the AUSF instance based on the information stored during operation 0. UDM verifies that KakmaID received from the AAnF is included in the stored authentication context for the UE. In operation 4d, the UDM returns the SUPI (corresponding to GPSI) and AUSF ID to the requesting AAnF. The provided SUPI can be used by the AAnF for subsequent key requests for the same UE, as needed or desired. In operation 4e, the AAnF discovers and selects AUSF based on the AUSF ID received from the UDM. Operations 5-9 are identical to operations 5-9 in FIGS. 9-10.

Figure 12:
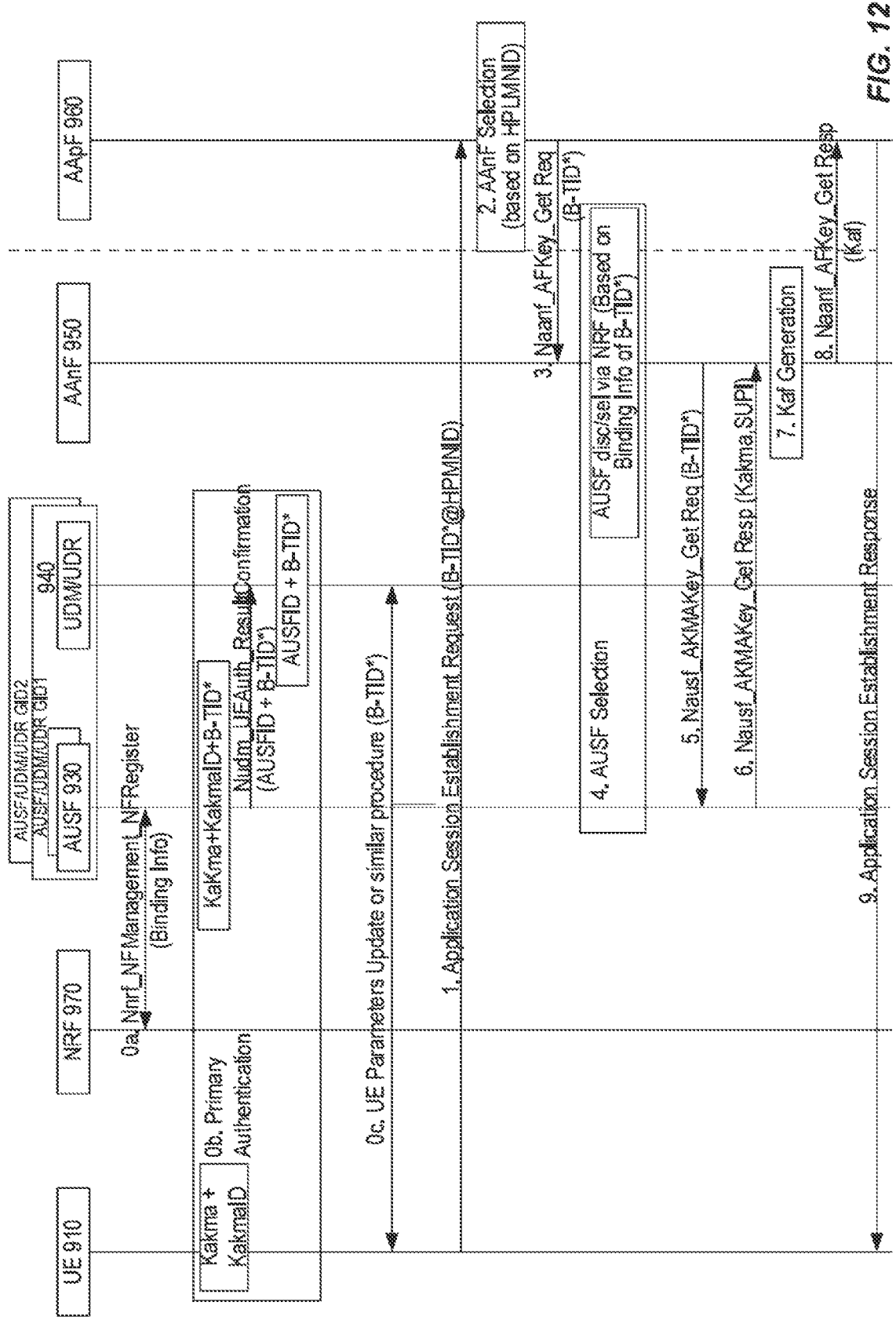

FIG. 12 is a flow diagram of another example procedure involving authentication support function (AUSF) selection during application session establishment, according to various example embodiments of the present disclosure. In particular, embodiments illustrated by FIG. 12 leverage existing UE parameters update (UPU) techniques to provide explicit binding information between Kakma and the AUSF ID that holds Kausf/Kakma that the UE is currently using. The entities shown in FIG. 12 use the same reference numbers as in FIGS. 9-11, which are omitted in the following description for the sake of brevity. However, the arrangement shown in FIG. 12 includes an NRF 970 rather than an AMF 920.

Although FIG. 12 shows numbered operations, these numbers are used to facilitate description of the procedure and not to require or imply a particular order of the operations. In other words, the operations shown in FIG. 12 can be performed in a different order than shown and can be combined and/or divided into operations different than the one shown.

In operation 0a, the AUSF registers its specific AKMA binding information in NRF, e.g., via an Nnrf_NFManagement_NFRegister service operation. The AKMA binding info can contain AUSF GroupID, SUPI range, AUSF fully qualified domain name (FQDN), AUSF IP address, and/or AUSF ID. In some embodiments, the AKMA binding information registered in operation 0a could be a hash of the above-mentioned parameters, which can increase privacy for AUSF.

In operation 0b, the UE runs a primary authentication with the network. Kakma and KakmaID are generated and stored in UE and AUSF. The AUSF also generates a binding identifier B-TID, which can include KakmaID, AKMA binding information (e.g., from operation 0a), and UE identifier(s) (e.g., GPSI). The AUSF calls the existing service operation Nudm_UEAuthentication_ResultConfirmation to inform UDM about the authentication result including SUPI, AUSF ID, Serving Network Name, authentication Type, and timestamp information. Additionally, AUSF provides B-TID. UDM then stores all information together.

In operation 0c, AUSF requests UDM (or UDM triggers itself) to update the B-TID for a particular UE via UE Parameters Update via UDM Control Plane Procedure or similar procedure. In operation 1, the UE initiates an application session setup procedure with the AF. The UE includes the B-TID received in operation 0c. In operations 2-3, the AF selects AAnF based on HPLM ID associated with the GPSI (e.g., included in B-TID) and sends the selected AAnF a request for Kaf to use in the application session with the UE. The request includes the B-TID received in operation 1. In operation 4, the AAnF discovers and selects AUSF via NRF, based on B-TID received from the AF. For example, the AAnF uses the AKMA binding information and/or UE information (e.g. GPSI) within B-TID* as input to the NRF discovery service.

In operation 5, the AAnF calls a service operation Nausf_AKMAKey_Get to send a request to the selected AUSF for Kakma, with B-TID included in the request. In operation 6, the AUSF returns Kakma back to AAnF, optionally together with SUPI. In other embodiments, the AAnF call an existing service from UDM (e.g., Nudm_SDM_GET (Identifier translation)) to map the UE information within B-TID* to the corresponding SUPI. AAnF then includes SUPI also in the service operation Nausf_AKMAKey_Get send in operation 5.

In operations 7-8, AAnF generates Kaf based on Kakma received from AUSF and provides Kaf to the AF. In operation 9, the AF establishes the secure application session with the UE based on Kaf received in operation 8.

In a variant of the procedure shown in FIG. 12, in operation 0c, the B-TID* may be provided to the UE piggybacked in existing NAS signalling during primary authentication and/or UE registration procedures. The other operations of this variant can be substantially identical to those shown in FIG. 12.

Figure 13:
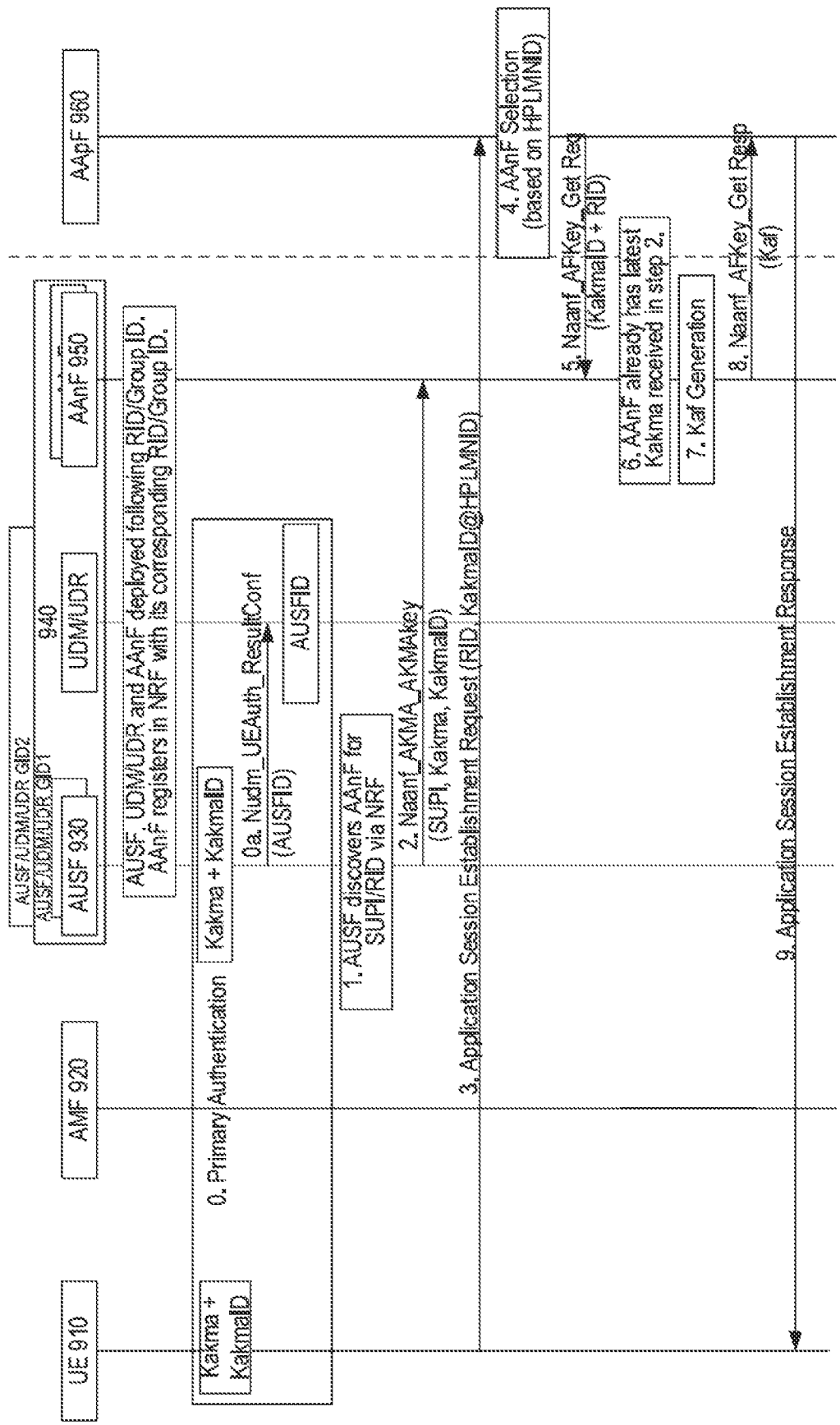

FIG. 13 is a flow diagram of another example procedure involving authentication support function (AUSF) selection during application session establishment, according to various example embodiments of the present disclosure. In particular, embodiments illustrated by FIG. 13 leverage NRF registration procedures to register the AAnF according to a range of routing identifiers (RIDs), which the AUSF can later discover via NRF. The entities shown in FIG. 13 use the same reference numbers as in FIGS. 9-11, which are omitted in the following description for the sake of brevity. Although FIG. 13 shows numbered operations, these numbers are used to facilitate description of the procedure and not to require or imply a particular order of the operations. In other words, the operations shown in FIG. 13 can be performed in a different order than shown, and can be combined and/or divided into operations different than the one shown.

As a pre-requisite for the embodiments illustrated in FIG. 13, an AAnF can be deployed within the HPLMN to use similar GroupID (GID), RID and/or SUPI range partitioning as used by the AUSF and/or UDM. In some embodiments, multiple AAnF instances can be deployed for each range partition. Similar to FIG. 12, the AAnF can register with an NRF (not shown in FIG. 13) in relation to its corresponding range partition.

Operation 0 is similar to operation 0 shown in FIGS. 9-11. In operation 1, after primary authentication and generation of Kakma, the AUSF discovers the AAnF instance(s) for the UE via NRF based on the UE's SUPI or RID. Note that multiple AAnF instances may be present for the UE's RID/GID. In operation 2, the AUSF proactively pushes Kakma, KakmaID, and SUPI for the UE to the AAnF. If multiple AAnF instances are deployed for the UE's RID/GID, the AUSF provides Kakma to all such AAnF instances. Operation 3 is similar to operation 3 in FIG. 9.

In operation 4, the AF selects the AAnF instance(s) based on HPLMN ID and RID received in operation 3. In operation 5, the AF calls a service operation Nausf_AKMAKey_Get to send a request to the selected AUSF for Kakma, with KakmaID and RID included in the request. In operation 6, after receiving the request, the AAnF matches KakmaID to the information received in operation 2 to determine that it has the latest Kakma. Operations 7-9 are identical to operations 7-9 of FIGS. 9-12.

The embodiments described above can be further illustrated by the example methods (e.g., procedures) shown in FIGS. 14-19, described below. For example, features of various embodiments discussed above are included in various operations of the example methods shown in FIGS. 14-19.

More specifically, FIG. 14 illustrates an example method (e.g., procedure) performed by a key management server (e.g., AAnF) in a communication network (e.g., 5GC), according to various example embodiments of the present disclosure. The key management server can be hosted and/or provided by one or more network nodes in the communication network, such as described elsewhere herein. Although the example method is illustrated in FIG. 14 by specific blocks in a particular order, the operations corresponding to the blocks can be performed in different orders than shown and can be combined and/or divided into blocks and/or operations having different functionality than shown. Furthermore, the example method shown in FIG. 14 can be complementary to other example methods and/or procedures disclosed herein (e.g., FIGS. 9-12, 16-17, 19), such that they can be used cooperatively to provide benefits, advantages, and/or solutions to problems described herein. Optional blocks and/or operations are indicated by dashed lines.

The example method can include the operations of block 1410, in which the key management server can receive, from an application function, a request for a security key (Kaf) specific to an application session for a particular user. The request can include a representation of the following information associated with the particular user: a first identifier (KakmaID) of a non-application-specific anchor security key (Kakma), and a second identifier related to a network subscription. The example method can also include the operations of block 1420, in which the key management server can, based on the representation, determine an authentication server function (AUSF) that generated the non-application-specific anchor security key (Kakma).

In some embodiments, the example method can also include the operations of block 1430, in which the key management server can obtain the non-application-specific anchor security key (Kakma) from the determined AUSF. In some embodiments, the example method can also include the operations of block 1440, in which the key management server can generate the security key (Kaf) specific to the application session based on the non-application-specific anchor security key (Kakma).

Certain embodiments of the method shown in FIG. 14 can correspond to the example procedure shown in FIG. 12. In such embodiments, the representation (e.g., received in block 1410) can include a third identifier (B-ID) of a binding between the non-application-specific anchor security key (Kakma) and the AUSF that generated Kakma. In particular, the third identifier can include the representation of the first and second identifiers, and information associated with the AUSF. In various embodiments, the information associated with the AUSF can include one or more of the following: AUSF Group ID, AUSF ID, subscription permanent identifier (SUPI) range, fully qualified domain name (FQDN), IP address.

In such embodiments, the determining operations of block 1420 can include the operations of sub-block 1421, where the key management server can discover an identity of the AUSF, via a network repository function (NRF), based on the information associated with the AUSF. Moreover, in such embodiments, the obtaining operations of block 1430 can include the operations of sub-blocks 1431-1432. In sub-block 1431, the key management server can send, to the determined AUSF (e.g., from block 1420), a request including the third identifier (e.g., B-TID). In sub-block 1432, the key management server can receive, from the determined AUSF, a response including the non-application-specific anchor security key (Kakma) and the second identifier.

Other embodiments of the method shown in FIG. 14 can correspond to the example procedures shown in FIGS. 9-11. In such embodiments, the representation of the first and second identifiers (e.g., received in block 1410) can include the first identifier (e.g., KakmaID) and the second identifier. For example, the second identifier can be any one of the following: HPLMN ID and user equipment routing identifier (RID); subscription concealed identifier (SUCI); subscription permanent identifier (SUPI); or generic public subscription identifier (GPSI). In a variant, the representation can include only the first identifier (e.g., KakmaID), which includes a representation of the second identifier.

In such embodiments, the determining operations of block 1420 can include the operations of sub-blocks 1422-1424. In sub-block 1422, the key management server can select a unified data management (UDM) function, in the communication network, based on the second identifier. In sub-block 1423, the key management server can send, to the UDM, a first request for a fourth identifier associated with the AUSF. In sub-block 1424, the key management server can receive, from the UDM, a first response including the fourth identifier. In some embodiments, the first response can also include a further second identifier related to the network subscription associated with the particular user. For example, the further second identifier can be a SUPI and the second identifier can be an identifier other than SUPI (e.g., GPSI, SUCI, HPLMN+RID).

In such embodiments, the obtaining operations of block 1430 can include the operations of sub-blocks 1433-1434. In sub-block 1433, the key management server can send, to the AUSF associated with the fourth identifier, a second request comprising the second identifier or a further second identifier related to the network subscription associated with the particular user. In sub-block 1434, the key management server can receive, from the AUSF, a second response including the non-application-specific anchor security key (Kakma). In some embodiments, either the second request or the second response can also include the second identifier. For example, if the second request includes the further second identifier (e.g., SUPI), the second response can include the second identifier (e.g., an identifier other than SUPI).

In some embodiments, the example method can also include the operations of block 1440, in which the key management server can send, to the application function, the security key specific to the application session (Kaf).

Figure 15:
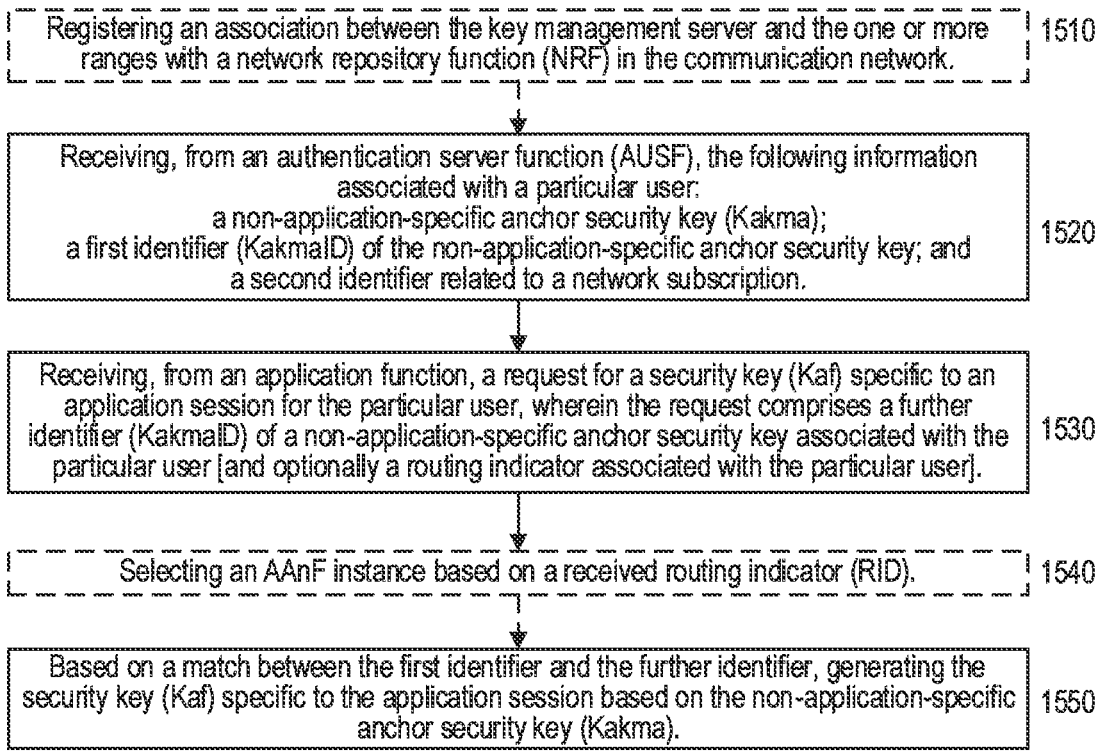

In addition, FIG. 15 illustrates another example method (e.g., procedure) performed by a key management server (e.g., AAnF) in a communication network (e.g., 5GC), according to various example embodiments of the present disclosure. The key management server can be hosted and/or provided by one or more network nodes in the communication network, such as described elsewhere herein. Although the example method is illustrated in FIG. 15 by specific blocks in a particular order, the operations corresponding to the blocks can be performed in different orders than shown and can be combined and/or divided into blocks and/or operations having different functionality than shown. Furthermore, the example method shown in FIG. 15 can be complementary to other example methods disclosed herein (e.g., FIGS. 13 and 18), such that they can be used cooperatively to provide benefits, advantages, and/or solutions to problems described herein. Optional blocks and/or operations are indicated by dashed lines.

The example method can include the operations of block 1520, in which the key management server can receive, from an authentication server function (AUSF), the following information associated with a particular user: a non-application-specific anchor security key (Kakma); a first identifier (KakmaID) of the non-application-specific anchor security key; and a second identifier related to a network subscription. In some embodiments, the second identifier can be a subscription permanent identifier (SUPI).

The example method can also include the operations of block 1530, in which the key management server can receive, from an application function, a request for a security key (Kaf) specific to an application session for the particular user, wherein the request comprises a further identifier (KakmaID) of a non-application-specific anchor security key associated with the particular user. The request can include a further identifier (KakmaID) of a non-application-specific anchor security key associated with the particular user. The example method can also include the operations of block 1550, in which the key management server can, based on a match between the first identifier and the further identifier (e.g., matching KakmaIDs), generate the security key (Kaf) specific to the application session based on the non-application-specific anchor security key (Kakma).

In some embodiments, the key management server can include a plurality of anchor function for authentication and key management for applications (AAnF) instances, each AAnF instance corresponding to a range of user equipment routing indicators (RIDs). In such embodiments, the request can also include a routing indicator (RID) associated with the particular user, and the example method can also include the operations of block 1540, where the key management server can select an AAnF instance based on the received RID (e.g., based on a match between the received RID and one of the ranges of RIDs). In such embodiments, generating the security key (Kaf) specific to the application session (e.g., in block 1550) is performed by the selected AAnF instance.

In some embodiments, the key management server can be associated with one or more ranges of user equipment routing indicators (RIDs). As an example, the key management server can include a plurality of AAnF instances, each AAnF instance corresponding to a range of user equipment routing indicators (RIDs). In such embodiments, the example method can also include the operations of block 1510, where the key management server can register an association between the key management server and the one or more ranges with a network repository function (NRF) in the communication network.

Figure 16:
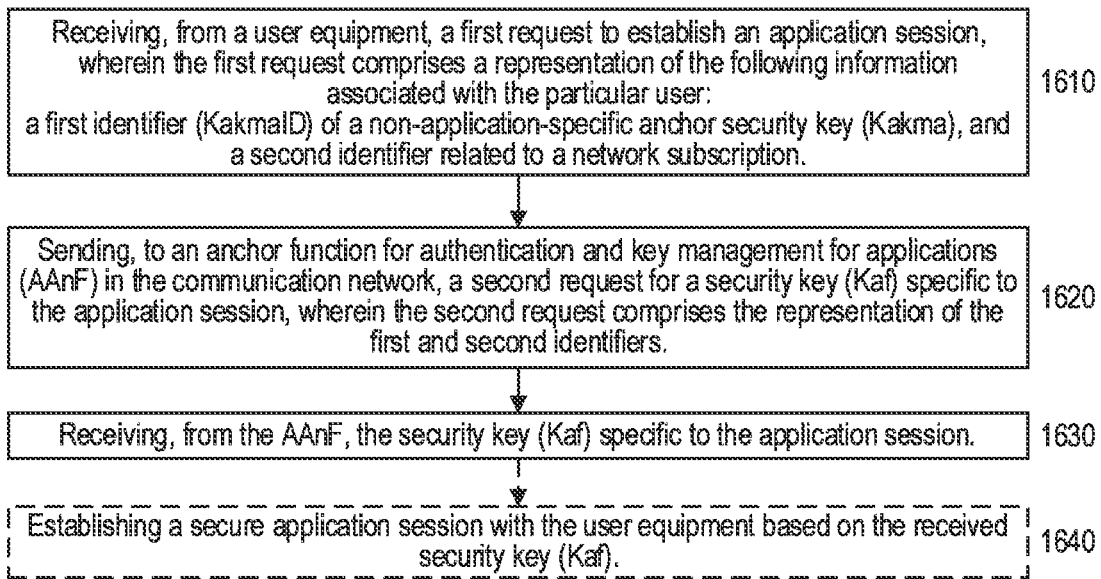
FIG. 16 illustrates an example method (e.g., procedure) performed by an application function (AF) in a communication network (e.g., 5GC), according to various example embodiments of the present disclosure.

In addition, FIG. 16 illustrates an example method (e.g., procedure) performed by an application function in a communication network, according to various example embodiments of the present disclosure. The application function can be hosted and/or provided by one or more network nodes in the communication network, such as described elsewhere herein. Although the example method is illustrated in FIG. 16 by specific blocks in a particular order, the operations corresponding to the blocks can be performed in different orders than shown and can be combined and/or divided into blocks and/or operations having different functionality than shown. Furthermore, the example method shown in FIG. 16 can be complementary to other example methods disclosed herein (e.g., FIGS. 9-15, 17-19), such that they can be used cooperatively to provide various benefits, advantages, and/or solutions to problems described herein. Optional blocks and/or operations are indicated by dashed lines.

The example method can include the operations of block 1610, where the application function can receive, from a user equipment, a first request to establish an application session. The first request can include a representation of the following information associated with the particular user: a first identifier (KakmaID) of a non-application-specific anchor security key (Kakma), and a second identifier related to a network subscription. The example method can also include the operations of block 1620, where the application function can send, to an anchor function for authentication and key management for applications (AAnF) in the communication network, a second request for a security key (Kaf) specific to the application session. The second request can include the representation of the first and second identifiers.

The example method can also include the operations of block 1630, where the application function can receive, from the AAnF, the security key (Kaf) specific to the application session. In some embodiments, the example method can also include the operations of block 1640, where the application function can establish a secure application session with the user equipment based on the received security key (Kaf).

Certain embodiments of the method shown in FIG. 16 can correspond to the example procedure shown in FIG. 12. In such embodiments, the representation (e.g., received in block 1610 and sent in block 1620) comprises a third identifier (B-ID) of a binding between the non-application-specific anchor security key (Kakma) and the AUSF that generated Kakma. In particular, the third identifier can include the representation of the first and second identifiers, and information associated with the AUSF. In various embodiments, the information associated with the AUSF can include one or more of the following: AUSF Group ID, AUSF ID, subscription permanent identifier (SUPI) range, fully qualified domain name (FQDN), IP address.

Other embodiments of the method shown in FIG. 16 can correspond to the example procedures shown in FIGS. 9-11. In such embodiments, the representation of the first and second identifiers (e.g., received in block 1410) can include the first identifier (e.g., KakmaID) and the second identifier. For example, the second identifier can be any one of the following: HPLMN ID and user equipment routing identifier (RID); subscription concealed identifier (SUCI); subscription permanent identifier (SUPI); or generic public subscription identifier (GPSI). In a variant, the representation can include only the first identifier (e.g., KakmaID), which includes a representation of the second identifier.

Figure 17:
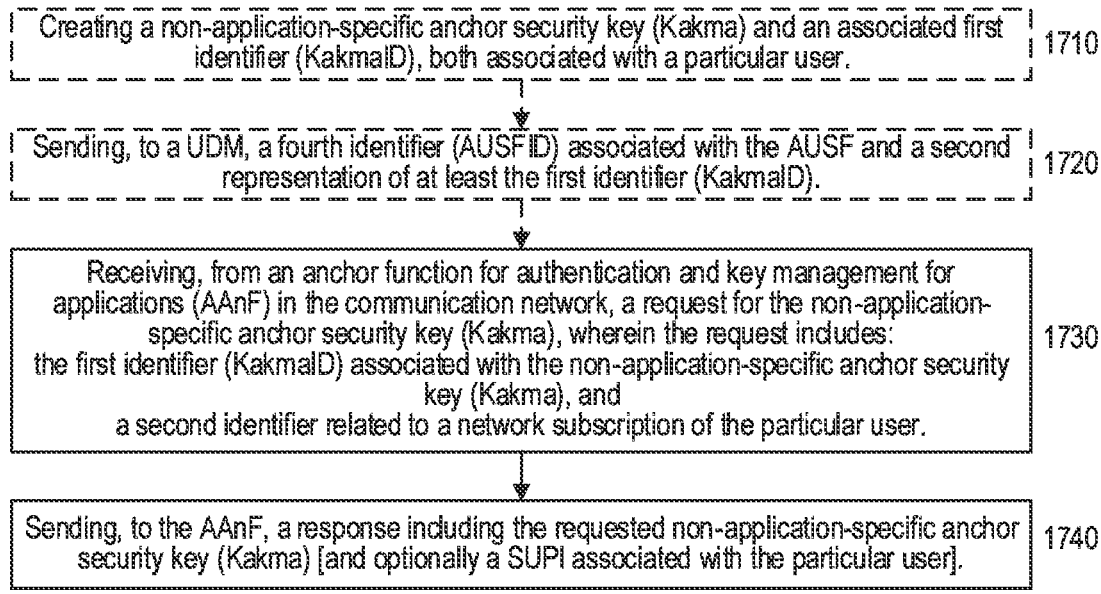
FIGS. 17-18 illustrate various example methods (e.g., procedures) performed by an authentication server function (AUSF) in a communication network (e.g., 5GC), according to various example embodiments of the present disclosure.

In addition, FIG. 17 illustrates an example method (e.g., procedure) performed by an authentication server function (AUSF) in a communication network (e.g., 5GC), according to various example embodiments of the present disclosure. The AUSF can be hosted and/or provided by one or more network nodes in the communication network, such as described elsewhere herein. Although the example method is illustrated in FIG. 17 by specific blocks in a particular order, the operations corresponding to the blocks can be performed in different orders than shown and can be combined and/or divided into blocks and/or operations having different functionality than shown. Furthermore, the example method shown in FIG. 17 can be complementary to other example methods disclosed herein (e.g., FIGS. 9-12, 14, 16, 19), such that they can be used cooperatively to provide various benefits, advantages, and/or solutions to problems described herein. Optional blocks and/or operations are indicated by dashed lines.

The example method can include the operations of block 1730, where the AUSF can receive, from an anchor function for authentication and key management for applications (AAnF) in the communication network, a request for a non-application-specific anchor security key (Kakma) for a particular user. The request can include a first representation of the following: the first identifier (KakmaID) associated with the non-application-specific anchor security key (Kakma), and a second identifier related to a network subscription of the particular user. The example method can also include the operations of block 1740, where the AUSF can send, to the AAnF, a response including the requested non-application-specific anchor security key (Kakma).

In some embodiments, the example method shown in FIG. 17 can include the operations of blocks 1710-1720. In block 1710, the AUSF can create the non-application-specific anchor security key (Kakma) for the particular user, as well as the first identifier (KakmaID). In block 1720, the AUSF can send, to a unified data management (UDM) function in the communication network, a fourth identifier (AUSFID) associated with the AUSF and a second representation of at least the first identifier (KakmaID).

Certain embodiments of the method shown in FIG. 17 can correspond to the example procedure shown in FIG. 12. In such embodiments, the first representation (e.g., received in block 1730) and the second representation (e.g., sent in block 1720) can include a third identifier (B-ID) of a binding between the non-application-specific anchor security key (Kakma) and the AUSF that generated Kakma. In particular, the third identifier can include the representation of the first and second identifiers, and information associated with the AUSF. In various embodiments, the information associated with the AUSF can include one or more of the following: AUSF Group ID, AUSF ID, subscription permanent identifier (SUPI) range, fully qualified domain name (FQDN), IP address. In such embodiments, the response (e.g., sent in block 1740) can also include a subscription permanent identifier (SUPI) associated with the particular user.

Other embodiments of the method shown in FIG. 17 can correspond to the example procedures shown in FIGS. 9-11. In such embodiments, the first representation of the first and second identifiers (e.g., received in block 1730) can include the first identifier (e.g., KakmaID) and the second identifier, while the second representation (e.g., sent in block 1720) can include only the first identifier. In such embodiments, the second identifier can be any one of the following: HPLMN ID and user equipment routing identifier (RID); subscription concealed identifier (SUCI); subscription permanent identifier (SUPI); or generic public subscription identifier (GPSI). In a variant, the first representation (e.g., received in block 1730) can include only the first identifier (e.g., KakmaID), which can include a representation of the second identifier.

Figure 18:
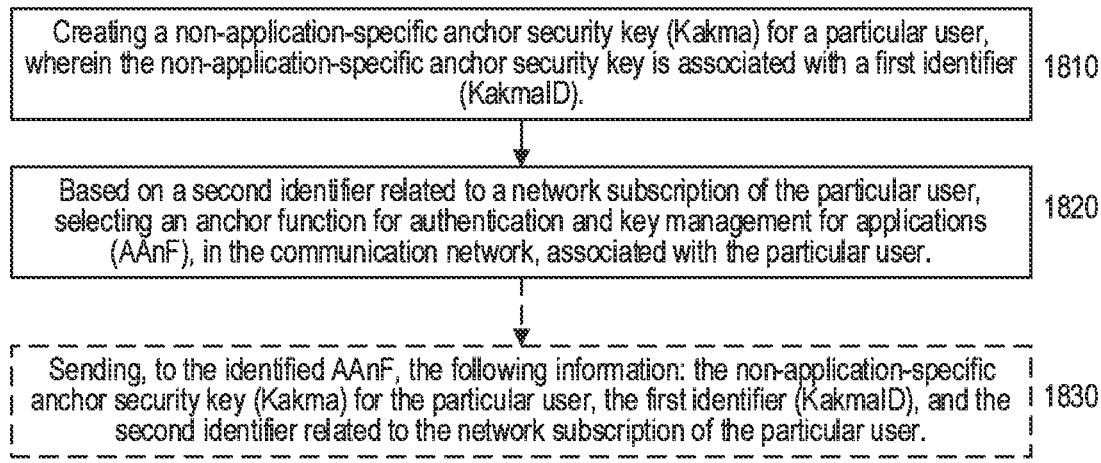

In addition, FIG. 18 illustrates another example method (e.g., procedure) performed by authentication server function (AUSF) in a communication network (e.g., 5GC), according to various example embodiments of the present disclosure. The AUSF can be hosted and/or provided by one or more network nodes in the communication network, such as described elsewhere herein. Although the example method is illustrated in FIG. 18 by specific blocks in a particular order, the operations corresponding to the blocks can be performed in different orders than shown and can be combined and/or divided into blocks and/or operations having different functionality than shown. Furthermore, the example method shown in FIG. 18 can be complementary to other example methods disclosed herein (e.g., FIGS. 13 and 15), such that they can be used cooperatively to provide benefits, advantages, and/or solutions to problems described herein. Optional blocks and/or operations are indicated by dashed lines.

The example method can include the operations of block 1810, where the AUSF can create a non-application-specific anchor security key (Kakma) for a particular user, wherein the non-application-specific anchor security key is associated with a first identifier (KakmaID). The example method can also include the operations of block 1820, where the AUSF can, based on a second identifier related to a network subscription of the particular user, select an anchor function for authentication and key management for applications (AAnF), in the communication network, associated with the particular user. In some embodiments, the example method can also include the operations of block 1830, where the AUSF can send, to the identified AAnF, the following information: the non-application-specific anchor security key (Kakma) for the particular user, the first identifier (KakmaID), and the second identifier related to the network subscription of the particular user. In various embodiments, the second identifier can be a subscription permanent identifier (SUPI) associated with the particular user.

Figure 19:
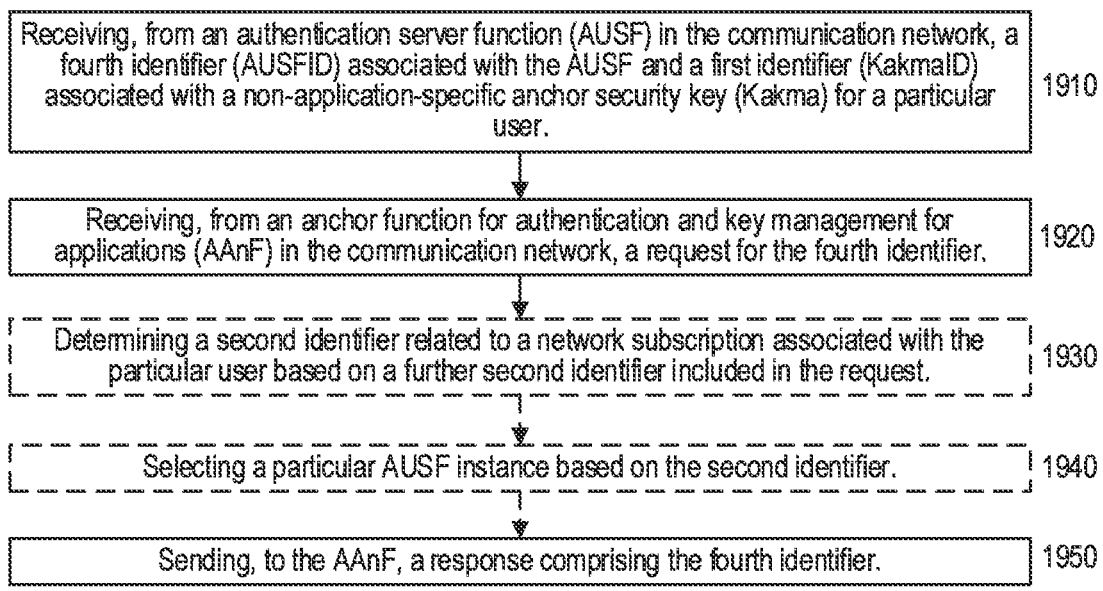
FIG. 19 illustrates an example method (e.g., procedure) performed by unified data management (UDM) function in a communication network (e.g., 5GC), according to various example embodiments of the present disclosure.

In addition, FIG. 19 illustrates an example method (e.g., procedure) performed by a unified data management (UDM) function in a communication network (e.g., 5GC), according to various example embodiments of the present disclosure.

The UDM function can be hosted and/or provided by one or more network nodes in the communication network, such as described elsewhere herein. Although the example method is illustrated in FIG. 19 by specific blocks in a particular order, the operations corresponding to the blocks can be performed in different orders than shown and can be combined and/or divided into blocks and/or operations having different functionality than shown. Furthermore, the example method shown in FIG. 19 can be complementary to other example methods disclosed herein (e.g., FIGS. 9-11, 14, 16-17), such that they can be used cooperatively to provide various benefits, advantages, and/or solutions to problems described herein. Optional blocks and/or operations are indicated by dashed lines.

The example method can include the operations of block 1910, where the UDM function can receive, from an authentication server function (AUSF) in the communication network, a fourth identifier (AUSFID) associated with the AUSF and a first identifier (KakmaID) associated with a non-application-specific anchor security key (Kakma) for a particular user. The example method can also include the operations of block 1920, where the UDM function can receive, from an anchor function for authentication and key management for applications (AAnF) in the communication network, a request for the fourth identifier. The example method can also include the operations of block 1950, where the UDM function can send, to the AAnF, a response comprising the fourth identifier.

In some embodiments, the request (e.g., received in block 1920) can include the first identifier (KakmaID) and the response (e.g., sent in block 1950) can include a second identifier related to a network subscription associated with the particular user. In some of these embodiments, the first identifier can include a representation of the second identifier. An example of such embodiments is shown in the procedure illustrated by FIG. 9.

In other of these embodiments, the request can include a further second identifier related to the network subscription associated with the particular user. In such embodiments, the example method can also include the operations of block 1930, where the UDM function can determine the second identifier based on the further second identifier. For example, the second identifier can be a subscription permanent identifier (SUPI), and the further second identifier is an identifier other than SUPI (e.g., SUCI, GPSI). Examples of such embodiments are shown in the procedures illustrated by FIGS. 10-11.

In various embodiments, the AUSF (e.g., from which the information was received in block 1910) can include a plurality of AUSF instances, each AUSF instance corresponding to a range of identifiers associated with network subscriptions (e.g., RIDs, SUPIs, etc.). In such embodiments, the example method can also include the operations of block 1940, where the UDM function can select a particular AUSF instance based on the second identifier (e.g., received in block 1920). In such embodiments, the fourth identifier (e.g., sent in block 1950) can correspond to the selected AUSF instance.

Figure 20:
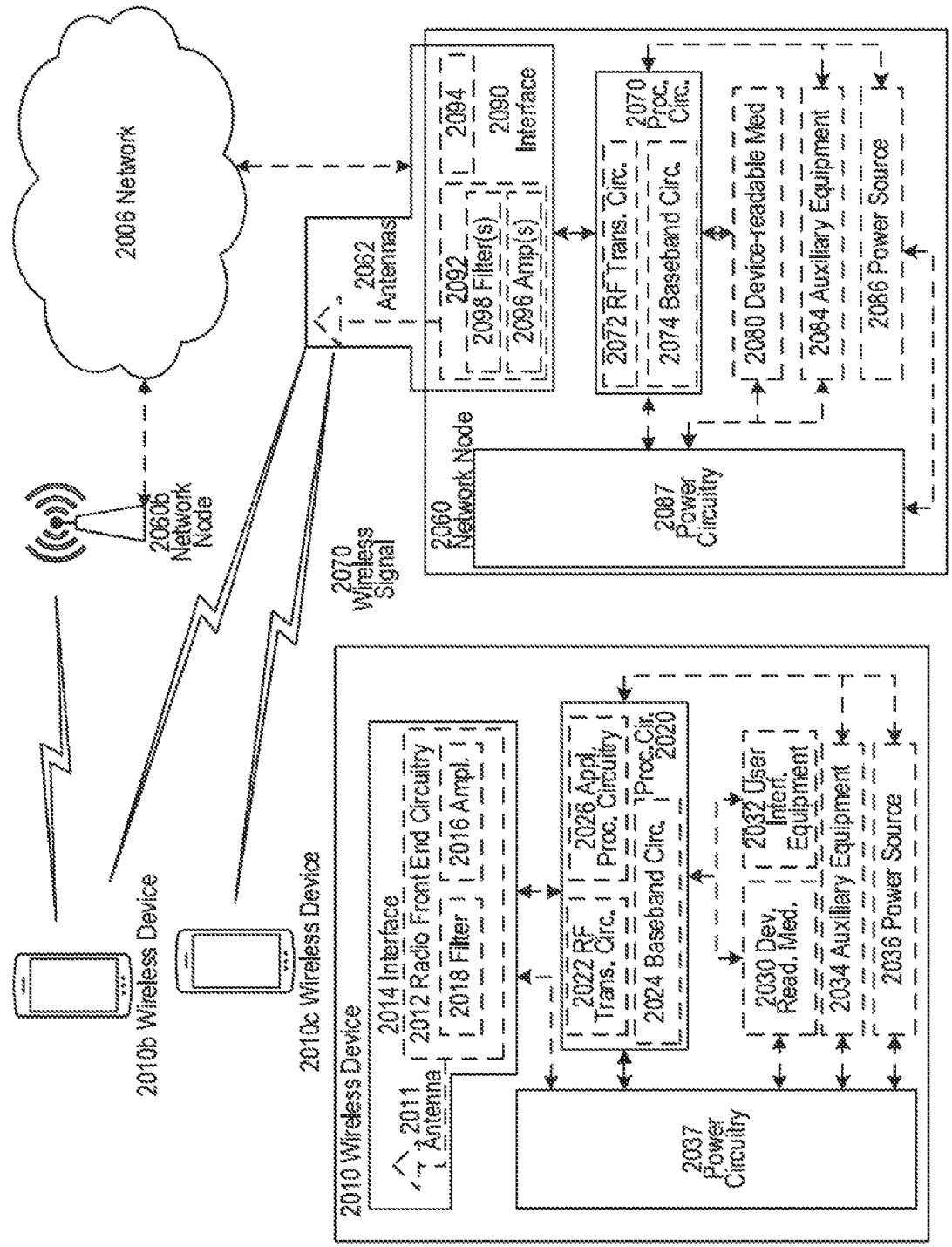
FIG. 20 illustrates an example embodiment of a wireless network, according to various example embodiments of the present disclosure.

Although the subject matter described herein can be implemented in any appropriate type of system using any suitable components, the embodiments disclosed herein are described in relation to a wireless network, such as the example wireless network illustrated in FIG. 20. For simplicity, the wireless network of FIG. 20 only depicts network 2006, network nodes 2060 and 2060b, and WDs 2010, 2010b, and 2010c. In practice, a wireless network can further include any additional elements suitable to support communication between wireless devices or between a wireless device and another communication device, such as a landline telephone, a service provider, or any other network node or end device. Of the illustrated components, network node 2060 and wireless device (WD) 2010 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2006 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2060 and WD 2010 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 20, network node 2060 includes processing circuitry 2070, device readable medium 2080, interface 2090, auxiliary equipment 2084, power source 2086, power circuitry 2087, and antenna 2062. Although network node 2060 illustrated in the example wireless network of FIG. 20 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 2060 are depicted as single boxes located within a larger box, or nested within multiple boxes, in practice, a network node can comprise multiple different physical components that make up a single illustrated component (e.g., device readable medium 2080 can comprise multiple separate hard drives as well as multiple RAM modules).

Similarly, network node 2060 can be composed of multiple physically separate components (e.g., a NodeB component and an RNC component, or a BTS component and a BSC component, etc.), which can each have their own respective components. In certain scenarios in which network node 2060 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 2060 can be configured to support multiple radio access technologies (RATs). In such embodiments, some components can be duplicated (e.g., separate device readable medium 2080 for the different RATs) and some components can be reused (e.g., the same antenna 2062 can be shared by the RATs). Network node 2060 can also include multiple sets of the various illustrated components for different wireless technologies integrated into network node 2060, such as, for example, GSM, WCDMA, LTE, NR, WiFi, or Bluetooth wireless technologies. These wireless technologies can be integrated into the same or different chip or set of chips and other components within network node 2060.

Processing circuitry 2070 can be configured to perform any determining, calculating, or similar operations (e.g., certain obtaining operations) described herein as being provided by a network node. These operations performed by processing circuitry 2070 can include processing information obtained by processing circuitry 2070 by, for example, converting the obtained information into other information, comparing the obtained information or converted information to information stored in the network node, and/or performing one or more operations based on the obtained information or converted information, and as a result of said processing making a determination.

Processing circuitry 2070 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 2060, either alone or in conjunction with other network node 2060 components (e.g., device readable medium 2080). Such functionality can include any of the various wireless features, functions, or benefits discussed herein.

For example, processing circuitry 2070 can execute instructions stored in device readable medium 2080 or in memory within processing circuitry 2070. In some embodiments, processing circuitry 2070 can include a system on a chip (SOC). As a more specific example, instructions (also referred to as a computer program product) stored in medium 2080 can include instructions that, when executed by processing circuitry 2070, can configure network node 2060 to perform operations corresponding to various example methods (e.g., procedures) described herein.

In some embodiments, processing circuitry 2070 can include one or more of radio frequency (RF) transceiver circuitry 2072 and baseband processing circuitry 2074. In some embodiments, radio frequency (RF) transceiver circuitry 2072 and baseband processing circuitry 2074 can be on separate chips (or sets of chips), boards, or units, such as radio units and digital units. In alternative embodiments, part or all of RF transceiver circuitry 2072 and baseband processing circuitry 2074 can be on the same chip or set of chips, boards, or units In certain embodiments, some or all of the functionality described herein as being provided by a network node, base station, eNB or other such network device can be performed by processing circuitry 2070 executing instructions stored on device readable medium 2080 or memory within processing circuitry 2070. In alternative embodiments, some or all of the functionality can be provided by processing circuitry 2070 without executing instructions stored on a separate or discrete device readable medium, such as in a hard-wired manner. In any of those embodiments, whether executing instructions stored on a device readable storage medium or not, processing circuitry 2070 can be configured to perform the described functionality. The benefits provided by such functionality are not limited to processing circuitry 2070 alone or to other components of network node 2060 but are enjoyed by network node 2060 as a whole, and/or by end users and the wireless network generally.

Device readable medium 2080 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 2070. Device readable medium 2080 can store any suitable instructions, data or information, including a computer program, software, an application including one or more of logic, rules, code, tables, etc. and/or other instructions capable of being executed by processing circuitry 2070 and, utilized by network node 2060. Device readable medium 2080 can be used to store any calculations made by processing circuitry 2070 and/or any data received via interface 2090. In some embodiments, processing circuitry 2070 and device readable medium 2080 can be considered to be integrated.

Interface 2090 is used in the wired or wireless communication of signaling and/or data between network node 2060, network 2006, and/or WDs 2010. As illustrated, interface 2090 comprises port(s)/terminal(s) 2094 to send and receive data, for example to and from network 2006 over a wired connection. Interface 2090 also includes radio front end circuitry 2092 that can be coupled to, or in certain embodiments a part of, antenna 2062. Radio front end circuitry 2092 comprises filters 2098 and amplifiers 2096. Radio front end circuitry 2092 can be connected to antenna 2062 and processing circuitry 2070. Radio front end circuitry can be configured to condition signals communicated between antenna 2062 and processing circuitry 2070. Radio front end circuitry 2092 can receive digital data that is to be sent out to other network nodes or WDs via a wireless connection. Radio front end circuitry 2092 can convert the digital data into a radio signal having the appropriate channel and bandwidth parameters using a combination of filters 2098 and/or amplifiers 2096. The radio signal can then be transmitted via antenna 2062. Similarly, when receiving data, antenna 2062 can collect radio signals which are then converted into digital data by radio front end circuitry 2092. The digital data can be passed to processing circuitry 2070. In other embodiments, the interface can comprise different components and/or different combinations of components.

In certain alternative embodiments, network node 2060 may not include separate radio front end circuitry 2092, instead, processing circuitry 2070 can comprise radio front end circuitry and can be connected to antenna 2062 without separate radio front end circuitry 2092. Similarly, in some embodiments, all or some of RF transceiver circuitry 2072 can be considered a part of interface 2090. In still other embodiments, interface 2090 can include one or more ports or terminals 2094, radio front end circuitry 2092, and RF transceiver circuitry 2072, as part of a radio unit (not shown), and interface 2090 can communicate with baseband processing circuitry 2074, which is part of a digital unit (not shown).

Antenna 2062 can include one or more antennas, or antenna arrays, configured to send and/or receive wireless signals. Antenna 2062 can be coupled to radio front end circuitry 2090 and can be any type of antenna capable of transmitting and receiving data and/or signals wirelessly. In some embodiments, antenna 2062 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 2062 can be separate from network node 2060 and can be connectable to network node 2060 through an interface or port.

Antenna 2062, interface 2090, and/or processing circuitry 2070 can be configured to perform any receiving operations and/or certain obtaining operations described herein as being performed by a network node. Any information, data and/or signals can be received from a wireless device, another network node and/or any other network equipment. Similarly, antenna 2062, interface 2090, and/or processing circuitry 2070 can be configured to perform any transmitting operations described herein as being performed by a network node. Any information, data and/or signals can be transmitted to a wireless device, another network node and/or any other network equipment.

Power circuitry 2087 can comprise, or be coupled to, power management circuitry and can be configured to supply the components of network node 2060 with power for performing the functionality described herein. Power circuitry 2087 can receive power from power source 2086. Power source 2086 and/or power circuitry 2087 can be configured to provide power to the various components of network node 2060 in a form suitable for the respective components (e.g., at a voltage and current level needed for each respective component). Power source 2086 can either be included in, or external to, power circuitry 2087 and/or network node 2060. For example, network node 2060 can be connectable to an external power source (e.g., an electricity outlet) via an input circuitry or interface such as an electrical cable, whereby the external power source supplies power to power circuitry 2087. As a further example, power source 2086 can comprise a source of power in the form of a battery or battery pack which is connected to, or integrated in, power circuitry 2087. The battery can provide backup power should the external power source fail. Other types of power sources, such as photovoltaic devices, can also be used.

Alternative embodiments of network node 2060 can include additional components beyond those shown in FIG. 20 that can be responsible for providing certain aspects of the network node's functionality, including any of the functionality described herein and/or any functionality necessary to support the subject matter described herein. For example, network node 2060 can include user interface equipment to allow and/or facilitate input of information into network node 2060 and to allow and/or facilitate output of information from network node 2060. This can allow and/or facilitate a user to perform diagnostic, maintenance, repair, and other administrative functions for network node 2060.

In some embodiments, a wireless device (WD, e.g., WD 2010) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 2010 includes antenna 2011, interface 2014, processing circuitry 2020, device readable medium 2030, user interface equipment 2032, auxiliary equipment 2034, power source 2036 and power circuitry 2037. WD 2010 can include multiple sets of one or more of the illustrated components for different wireless technologies supported by WD 2010, such as, for example, GSM, WCDMA, LTE, NR, WiFi, WiMAX, or Bluetooth wireless technologies, just to mention a few. These wireless technologies can be integrated into the same or different chips or set of chips as other components within WD 2010.

Antenna 2011 can include one or more antennas or antenna arrays, configured to send and/or receive wireless signals, and is connected to interface 2014. In certain alternative embodiments, antenna 2011 can be separate from WD 2010 and be connectable to WD 2010 through an interface or port. Antenna 2011, interface 2014, and/or processing circuitry 2020 can be configured to perform any receiving or transmitting operations described herein as being performed by a WD. Any information, data and/or signals can be received from a network node and/or another WD. In some embodiments, radio front end circuitry and/or antenna 2011 can be considered an interface.

As illustrated, interface 2014 comprises radio front end circuitry 2012 and antenna 2011. Radio front end circuitry 2012 comprise one or more filters 2018 and amplifiers 2016. Radio front end circuitry 2014 is connected to antenna 2011 and processing circuitry 2020 and can be configured to condition signals communicated between antenna 2011 and processing circuitry 2020. Radio front end circuitry 2012 can be coupled to or a part of antenna 2011. In some embodiments, WD 2010 may not include separate radio front end circuitry 2012; rather, processing circuitry 2020 can comprise radio front end circuitry and can be connected to antenna 2011. Similarly, in some embodiments, some or all of RF transceiver circuitry 2022 can be considered a part of interface 2014. Radio front end circuitry 2012 can receive digital data that is to be sent out to other network nodes or WDs via a wireless connection. Radio front end circuitry 2012 can convert the digital data into a radio signal having the appropriate channel and bandwidth parameters using a combination of filters 2018 and/or amplifiers 2016. The radio signal can then be transmitted via antenna 2011. Similarly, when receiving data, antenna 2011 can collect radio signals which are then converted into digital data by radio front end circuitry 2012. The digital data can be passed to processing circuitry 2020. In other embodiments, the interface can comprise different components and/or different combinations of components.

Processing circuitry 2020 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 2010 functionality either alone or in combination with other WD 2010 components, such as device readable medium 2030. Such functionality can include any of the various wireless features or benefits discussed herein.

For example, processing circuitry 2020 can execute instructions stored in device readable medium 2030 or in memory within processing circuitry 2020 to provide the functionality disclosed herein. More specifically, instructions (also referred to as a computer program product) stored in medium 2030 can include instructions that, when executed by processing circuitry 2020, can configure wireless device 2010 to perform operations corresponding to various example methods (e.g., procedures) described herein.

As illustrated, processing circuitry 2020 includes one or more of RF transceiver circuitry 2022, baseband processing circuitry 2024, and application processing circuitry 2026. In other embodiments, the processing circuitry can comprise different components and/or different combinations of components. In certain embodiments processing circuitry 2020 of WD 2010 can comprise a SOC. In some embodiments, RF transceiver circuitry 2022, baseband processing circuitry 2024, and application processing circuitry 2026 can be on separate chips or sets of chips. In alternative embodiments, part or all of baseband processing circuitry 2024 and application processing circuitry 2026 can be combined into one chip or set of chips, and RF transceiver circuitry 2022 can be on a separate chip or set of chips. In still alternative embodiments, part or all of RF transceiver circuitry 2022 and baseband processing circuitry 2024 can be on the same chip or set of chips, and application processing circuitry 2026 can be on a separate chip or set of chips. In yet other alternative embodiments, part or all of RF transceiver circuitry 2022, baseband processing circuitry 2024, and application processing circuitry 2026 can be combined in the same chip or set of chips. In some embodiments, RF transceiver circuitry 2022 can be a part of interface 2014. RF transceiver circuitry 2022 can condition RF signals for processing circuitry 2020.

In certain embodiments, some or all of the functionality described herein as being performed by a WD can be provided by processing circuitry 2020 executing instructions stored on device readable medium 2030, which in certain embodiments can be a computer-readable storage medium. In alternative embodiments, some or all of the functionality can be provided by processing circuitry 2020 without executing instructions stored on a separate or discrete device readable storage medium, such as in a hard-wired manner. In any of those particular embodiments, whether executing instructions stored on a device readable storage medium or not, processing circuitry 2020 can be configured to perform the described functionality. The benefits provided by such functionality are not limited to processing circuitry 2020 alone or to other components of WD 2010, but are enjoyed by WD 2010 as a whole, and/or by end users and the wireless network generally.

Processing circuitry 2020 can be configured to perform any determining, calculating, or similar operations (e.g., certain obtaining operations) described herein as being performed by a WD. These operations, as performed by processing circuitry 2020, can include processing information obtained by processing circuitry 2020 by, for example, converting the obtained information into other information, comparing the obtained information or converted information to information stored by WD 2010, and/or performing one or more operations based on the obtained information or converted information, and as a result of said processing making a determination.

Device readable medium 2030 can be operable to store a computer program, software, an application including one or more of logic, rules, code, tables, etc. and/or other instructions capable of being executed by processing circuitry 2020. Device readable medium 2030 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 2020. In some embodiments, processing circuitry 2020 and device readable medium 2030 can be considered to be integrated.

User interface equipment 2032 can include components that allow and/or facilitate a human user to interact with WD 2010. Such interaction can be of many forms, such as visual, audial, tactile, etc. User interface equipment 2032 can be operable to produce output to the user and to allow and/or facilitate the user to provide input to WD 2010. The type of interaction can vary depending on the type of user interface equipment 2032 installed in WD 2010. For example, if WD 2010 is a smart phone, the interaction can be via a touch screen; if WD 2010 is a smart meter, the interaction can be through a screen that provides usage (e.g., the number of gallons used) or a speaker that provides an audible alert (e.g., if smoke is detected). User interface equipment 2032 can include input interfaces, devices and circuits, and output interfaces, devices and circuits. User interface equipment 2032 can be configured to allow and/or facilitate input of information into WD 2010 and is connected to processing circuitry 2020 to allow and/or facilitate processing circuitry 2020 to process the input information. User interface equipment 2032 can include, for example, a microphone, a proximity or other sensor, keys/buttons, a touch display, one or more cameras, a USB port, or other input circuitry. User interface equipment 2032 is also configured to allow and/or facilitate output of information from WD 2010, and to allow and/or facilitate processing circuitry 2020 to output information from WD 2010. User interface equipment 2032 can include, for example, a speaker, a display, vibrating circuitry, a USB port, a headphone interface, or other output circuitry. Using one or more input and output interfaces, devices, and circuits, of user interface equipment 2032, WD 2010 can communicate with end users and/or the wireless network and allow and/or facilitate them to benefit from the functionality described herein.

Auxiliary equipment 2034 is operable to provide more specific functionality which may not be generally performed by WDs. This can comprise specialized sensors for doing measurements for various purposes, interfaces for additional types of communication such as wired communications etc. The inclusion and type of components of auxiliary equipment 2034 can vary depending on the embodiment and/or scenario.

Power source 2036 can, in some embodiments, be in the form of a battery or battery pack. Other types of power sources, such as an external power source (e.g., an electricity outlet), photovoltaic devices or power cells, can also be used. WD 2010 can further comprise power circuitry 2037 for delivering power from power source 2036 to the various parts of WD 2010 which need power from power source 2036 to carry out any functionality described or indicated herein. Power circuitry 2037 can in certain embodiments comprise power management circuitry. Power circuitry 2037 can additionally or alternatively be operable to receive power from an external power source; in which case WD 2010 can be connectable to the external power source (such as an electricity outlet) via input circuitry or an interface such as an electrical power cable. Power circuitry 2037 can also in certain embodiments be operable to deliver power from an external power source to power source 2036. This can be, for example, for the charging of power source 2036. Power circuitry 2037 can perform any converting or other modification to the power from power source 2036 to make it suitable for supply to the respective components of WD 2010.

Figure 21:
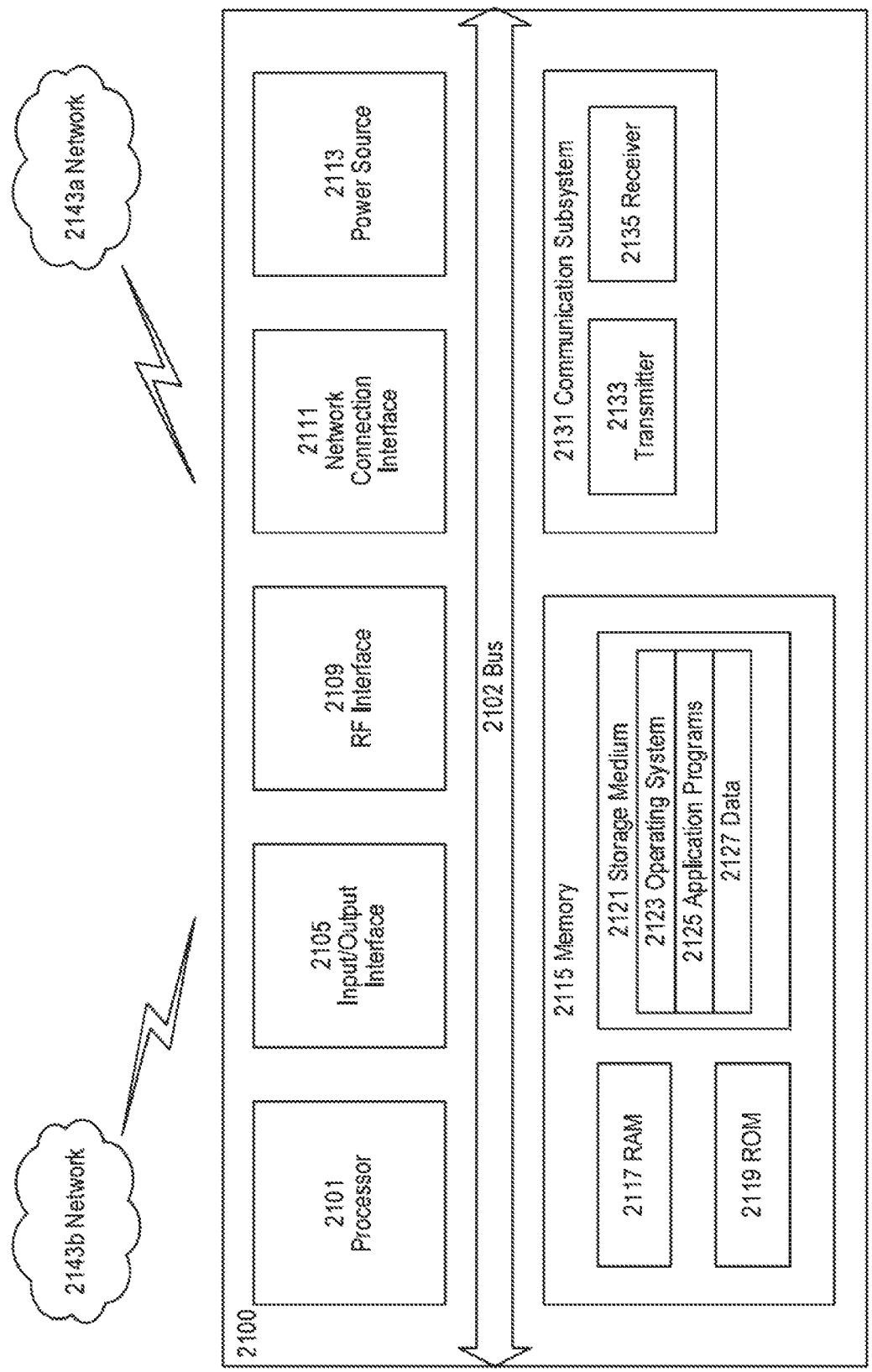
FIG. 21 illustrates an example embodiment of a UE, according to various example embodiments of the present disclosure.

FIG. 21 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 2100 can be any UE identified by the $3^{rd}$ Generation Partnership Project (3GPP), including a NB-IoT UE, a machine type communication (MTC) UE, and/or an enhanced MTC (eMTC) UE. UE 2100, as illustrated in FIG. 21, is one example of a WD configured for communication in accordance with one or more communication standards promulgated by the $3^{rd}$ Generation Partnership Project (3GPP), such as 3GPP's GSM, UNITS, LTE, and/or 5G standards. As mentioned previously, the term WD and UE can be used interchangeable. Accordingly, although FIG. 21 is a UE, the components discussed herein are equally applicable to a WD, and vice-versa.

In FIG. 21, UE 2100 includes processing circuitry 2101 that is operatively coupled to input/output interface 2105, radio frequency (RF) interface 2109, network connection interface 2111, memory 2115 including random access memory (RAM) 2117, read-only memory (ROM) 2119, and storage medium 2121 or the like, communication subsystem 2131, power source 2133, and/or any other component, or any combination thereof. Storage medium 2121 includes operating system 2123, application program 2125, and data 2127. In other embodiments, storage medium 2121 can include other similar types of information. Certain UEs can utilize all of the components shown in FIG. 21, or only a subset of the components. The level of integration between the components can vary from one UE to another UE. Further, certain UEs can contain multiple instances of a component, such as multiple processors, memories, transceivers, transmitters, receivers, etc.

In FIG. 21, processing circuitry 2101 can be configured to process computer instructions and data. Processing circuitry 2101 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2101 can include two central processing units (CPUs). Data can be information in a form suitable for use by a computer.

In the depicted embodiment, input/output interface 2105 can be configured to provide a communication interface to an input device, output device, or input and output device. UE 2100 can be configured to use an output device via input/output interface 2105. An output device can use the same type of interface port as an input device. For example, a USB port can be used to provide input to and output from UE 2100. The output device can be a speaker, a sound card, a video card, a display, a monitor, a printer, an actuator, an emitter, a smartcard, another output device, or any combination thereof. UE 2100 can be configured to use an input device via input/output interface 2105 to allow and/or facilitate a user to capture information into UE 2100. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 21, RF interface 2109 can be configured to provide a communication interface to RF components such as a transmitter, a receiver, and an antenna. Network connection interface 2111 can be configured to provide a communication interface to network 2143*a*. Network 2143*a* can encompass wired and/or wireless networks such as a local-area network (LAN), a wide-area network (WAN), a computer network, a wireless network, a telecommunications network, another like network or any combination thereof. For example, network 2143*a* can comprise a Wi-Fi network. Network connection interface 2111 can be configured to include a receiver and a transmitter interface used to communicate with one or more other devices over a communication network according to one or more communication protocols, such as Ethernet, TCP/IP, SONET, ATM, or the like. Network connection interface 2111 can implement receiver and transmitter functionality appropriate to the communication network links (e.g., optical, electrical, and the like). The transmitter and receiver functions can share circuit components, software or firmware, or alternatively can be implemented separately.

RAM 2117 can be configured to interface via bus 2102 to processing circuitry 2101 to provide storage or caching of data or computer instructions during the execution of software programs such as the operating system, application programs, and device drivers. ROM 2119 can be configured to provide computer instructions or data to processing circuitry 2101. For example, ROM 2119 can be configured to store invariant low-level system code or data for basic system functions such as basic input and output (I/O), startup, or reception of keystrokes from a keyboard that are stored in a non-volatile memory. Storage medium 2121 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 2121 can be configured to include operating system 2123; application program 2125 such as a web browser application, a widget or gadget engine or another application; and data file 2127. Storage medium 2121 can store, for use by UE 2100, any of a variety of various operating systems or combinations of operating systems. For example, application program 2125 can include executable program instructions (also referred to as a computer program product) that, when executed by processor 2101, can configure UE 2100 to perform operations corresponding to various example methods (e.g., procedures) described herein.

Storage medium 2121 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2121 can allow and/or facilitate UE 2100 to access computer-executable instructions, application programs or the like, stored on transitory or non-transitory memory media, to off-load data, or to upload data. An article of manufacture, such as one utilizing a communication system can be tangibly embodied in storage medium 2121, which can comprise a device readable medium.

In FIG. 21, processing circuitry 2101 can be configured to communicate with network 2143*b* using communication subsystem 2131. Network 2143*a* and network 2143*b* can be the same network or networks or different network or networks. Communication subsystem 2131 can be configured to include one or more transceivers used to communicate with network 2143*b*. For example, communication subsystem 2131 can be configured to include one or more transceivers used to communicate with one or more remote transceivers of another device capable of wireless communication such as another WD, UE, or base station of a radio access network (RAN) according to one or more communication protocols, such as IEEE 802.21, CDMA, WCDMA, GSM, LTE, UTRAN, WiMax, or the like. Each transceiver can include transmitter 2133 and/or receiver 2135 to implement transmitter or receiver functionality, respectively, appropriate to the RAN links (e.g., frequency allocations and the like). Further, transmitter 2133 and receiver 2135 of each transceiver can share circuit components, software or firmware, or alternatively can be implemented separately.

In the illustrated embodiment, the communication functions of communication subsystem 2131 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 2131 can include cellular communication, Wi-Fi communication, Bluetooth communication, and GPS communication. Network 2143*b* can encompass wired and/or wireless networks such as a local-area network (LAN), a wide-area network (WAN), a computer network, a wireless network, a telecommunications network, another like network or any combination thereof. For example, network 2143*b* can be a cellular network, a Wi-Fi network, and/or a near-field network. Power source 2113 can be configured to provide alternating current (AC) or direct current (DC) power to components of UE 2100.

The features, benefits and/or functions described herein can be implemented in one of the components of UE 2100 or partitioned across multiple components of UE 2100. Further, the features, benefits, and/or functions described herein can be implemented in any combination of hardware, software or firmware. In one example, communication subsystem 2131 can be configured to include any of the components described herein. Further, processing circuitry 2101 can be configured to communicate with any of such components over bus 2102. In another example, any of such components can be represented by program instructions stored in memory that when executed by processing circuitry 2101 perform the corresponding functions described herein. In another example, the functionality of any of such components can be partitioned between processing circuitry 2101 and communication subsystem 2131. In another example, the non-computationally intensive functions of any of such components can be implemented in software or firmware and the computationally intensive functions can be implemented in hardware.

Figure 22:
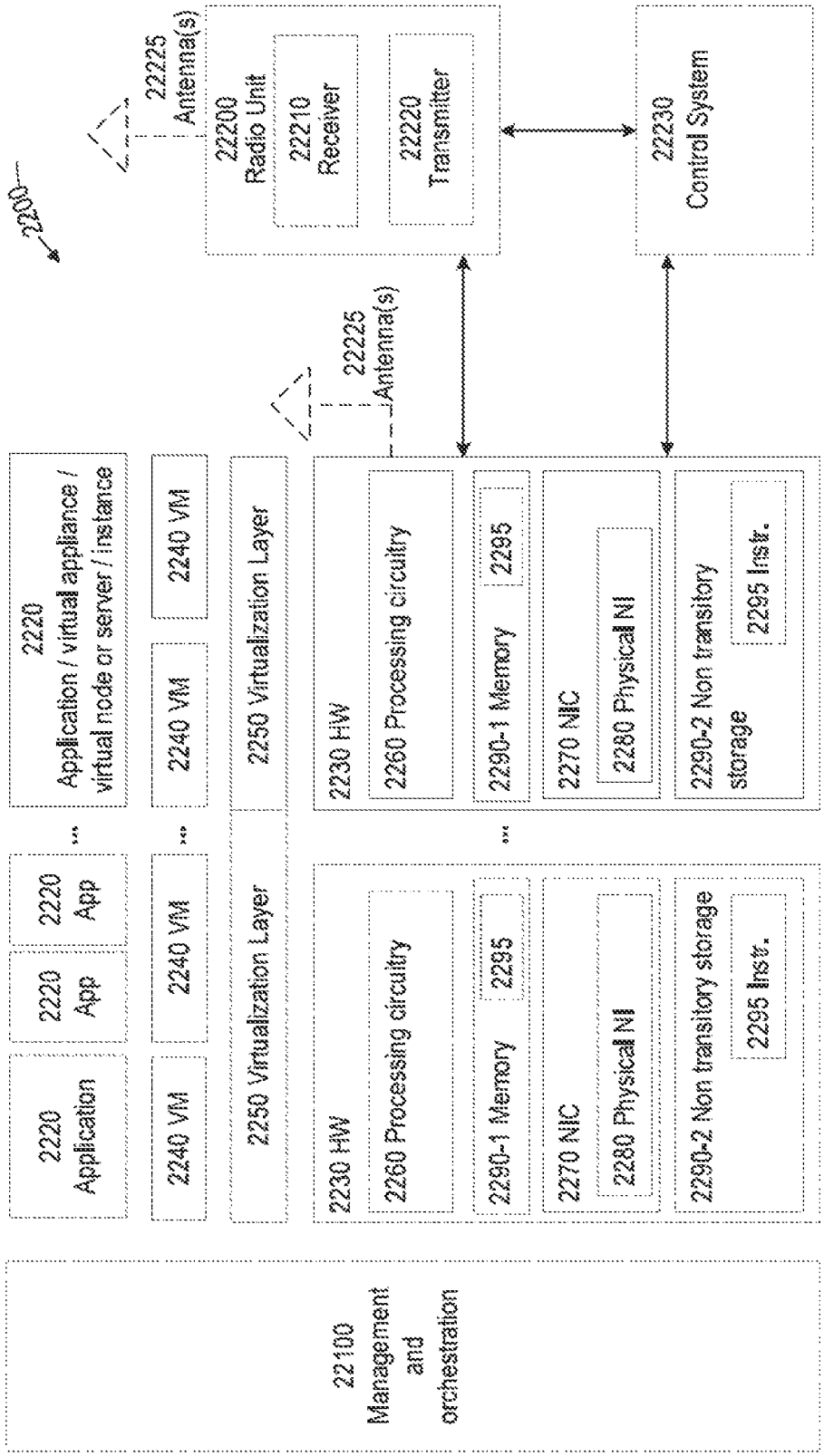
FIG. 22 is a block diagram illustrating an example virtualization environment usable for implementation of various embodiments described herein.

FIG. 22 is a schematic block diagram illustrating a virtualization environment 2200 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 2200 hosted by one or more of hardware nodes 2230. Further, in embodiments in which the virtual node is not a radio access node or does not require radio connectivity (e.g., a core network node), then the network node can be entirely virtualized.

The functions can be implemented by one or more applications 2220 (which can alternatively be called software instances, virtual appliances, network functions, virtual nodes, virtual network functions, etc.) operative to implement some of the features, functions, and/or benefits of some of the embodiments disclosed herein. Applications 2220 are run in virtualization environment 2200 which provides hardware 2230 comprising processing circuitry 2260 and memory 2290. Memory 2290 contains instructions 2295 executable by processing circuitry 2260 whereby application 2220 is operative to provide one or more of the features, benefits, and/or functions disclosed herein.

Virtualization environment 2200 can include general-purpose or special-purpose network hardware devices (or nodes) 2230 comprising a set of one or more processors or processing circuitry 2260, which can be commercial off-the-shelf (COTS) processors, dedicated Application Specific Integrated Circuits (ASICs), or any other type of processing circuitry including digital or analog hardware components or special purpose processors. Each hardware device can comprise memory 2290-1 which can be non-persistent memory for temporarily storing instructions 2295 or software executed by processing circuitry 2260. For example, instructions 2295 can include program instructions (also referred to as a computer program product) that, when executed by processing circuitry 2260, can configure hardware node 2220 to perform operations corresponding to various example methods (e.g., procedures) described herein. Such operations can also be attributed to virtual node(s) 2220 that is/are hosted by hardware node 2230.

Each hardware device can comprise one or more network interface controllers (NICs) 2270, also known as network interface cards, which include physical network interface 2280. Each hardware device can also include non-transitory, persistent, machine-readable storage media 2290-2 having stored therein software 2295 and/or instructions executable by processing circuitry 2260. Software 2295 can include any type of software including software for instantiating one or more virtualization layers 2250 (also referred to as hypervisors), software to execute virtual machines 2240 as well as software allowing it to execute functions, features and/or benefits described in relation with some embodiments described herein.

Virtual machines 2240, comprise virtual processing, virtual memory, virtual networking or interface and virtual storage, and can be run by a corresponding virtualization layer 2250 or hypervisor. Different embodiments of the instance of virtual appliance 2220 can be implemented on one or more of virtual machines 2240, and the implementations can be made in different ways.

During operation, processing circuitry 2260 executes software 2295 to instantiate the hypervisor or virtualization layer 2250, which can sometimes be referred to as a virtual machine monitor (VMM). Virtualization layer 2250 can present a virtual operating platform that appears like networking hardware to virtual machine 2240.

As shown in FIG. 22, hardware 2230 can be a standalone network node with generic or specific components. Hardware 2230 can comprise antenna 22225 and can implement some functions via virtualization. Alternatively, hardware 2230 can be part of a larger cluster of hardware (e.g., such as in a data center or customer premise equipment (CPE)) where many hardware nodes work together and are managed via management and orchestration (MANO) 22100, which, among others, oversees lifecycle management of applications 2220.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 2240 can be a software implementation of a physical machine that runs programs as if they were executing on a physical, non-virtualized machine. Each of virtual machines 2240, and that part of hardware 2230 that executes that virtual machine, be it hardware dedicated to that virtual machine and/or hardware shared by that virtual machine with others of the virtual machines 2240, forms a separate virtual network elements (VNE).

Still in the context of NFV, Virtual Network Function (VNF) is responsible for handling specific network functions that run in one or more virtual machines 2240 on top of hardware networking infrastructure 2230 and corresponds to application 2220 in FIG. 22.

In some embodiments, one or more radio units 22200 that each include one or more transmitters 22220 and one or more receivers 22210 can be coupled to one or more antennas 22225. Radio units 22200 can communicate directly with hardware nodes 2230 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 22230, which can alternatively be used for communication between the hardware nodes 2230 and radio units 22200.

Figure 23:
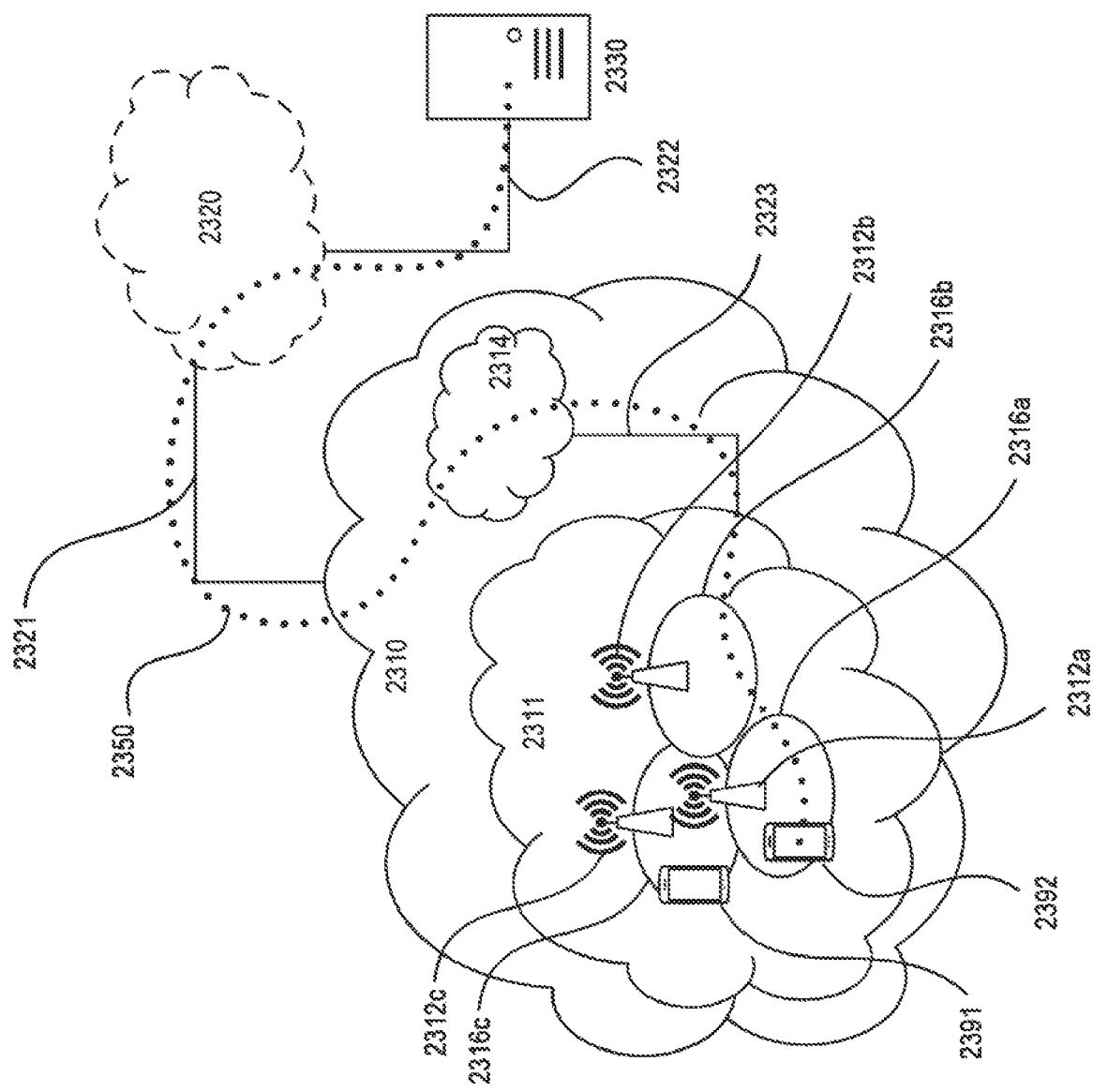
FIGS. 23-24 are block diagrams of various example communication systems and/or networks, according to various example embodiments of the present disclosure.

With reference to FIG. 23, in accordance with an embodiment, a communication system includes telecommunication network 2310, such as a 3GPP-type cellular network, which comprises access network 2311, such as a radio access network, and core network 2314. Access network 2311 comprises a plurality of base stations 2312a, 2312b, 2312c, such as NBs, eNBs, gNBs or other types of wireless access points, each defining a corresponding coverage area 2313a, 2313b, 2313c. Each base station 2312a, 2312b, 2312c is connectable to core network 2314 over a wired or wireless connection 2315. A first UE 2391 located in coverage area 2313c can be configured to wirelessly connect to, or be paged by, the corresponding base station 2312c. A second UE 2392 in coverage area 2313a is wirelessly connectable to the corresponding base station 2312a. While a plurality of UEs 2391, 2392 are illustrated in this example, the disclosed embodiments are equally applicable to a situation where a sole UE is in the coverage area or where a sole UE is connecting to the Telecommunication network 2310 is itself connected to host computer 2330, which can be embodied in the hardware and/or software of a standalone server, a cloud-implemented server, a distributed server or as processing resources in a server farm. Host computer 2330 can be under the ownership or control of a service provider or can be operated by the service provider or on behalf of the service provider. Connections 2321 and 2322 between telecommunication network 2310 and host computer 2330 can extend directly from core network 2314 to host computer 2330 or can go via an optional intermediate network 2320. Intermediate network 2320 can be one of, or a combination of more than one of, a public, private or hosted network; intermediate network 2320, if any, can be a backbone network or the Internet; in particular, intermediate network 2320 can comprise two or more sub-networks (not shown).

The communication system of FIG. 23 as a whole enables connectivity between the connected UEs 2391, 2392 and host computer 2330. The connectivity can be described as an over-the-top (OTT) connection 2350. Host computer 2330 and the connected UEs 2391, 2392 are configured to communicate data and/or signaling via OTT connection 2350, using access network 2311, core network 2314, any intermediate network 2320 and possible further infrastructure (not shown) as intermediaries. OTT connection 2350 can be transparent in the sense that the participating communication devices through which OTT connection 2350 passes are unaware of routing of uplink and downlink communications. For example, base station 2312 may not or need not be informed about the past routing of an incoming downlink communication with data originating from host computer 2330 to be forwarded (e.g., handed over) to a connected UE 2391. Similarly, base station 2312 need not be aware of the future routing of an outgoing uplink communication originating from the UE 2391 towards the host computer 2330.

Example implementations, in accordance with an embodiment, of the UE, base station and host computer discussed in the preceding paragraphs will now be described with reference to FIG. 24. In communication system 2400, host computer 2410 comprises hardware 2415 including communication interface 2416 configured to set up and maintain a wired or wireless connection with an interface of a different communication device of communication system 2400. Host computer 2410 further comprises processing circuitry 2418, which can have storage and/or processing capabilities. In particular, processing circuitry 2418 can comprise one or more programmable processors, application-specific integrated circuits, field programmable gate arrays or combinations of these (not shown) adapted to execute instructions. Host computer 2410 further comprises software 2411, which is stored in or accessible by host computer 2410 and executable by processing circuitry 2418. Software 2411 includes host application 2412. Host application 2412 can be operable to provide a service to a remote user, such as UE 2430 connecting via OTT connection 2450 terminating at UE 2430 and host computer 2410. In providing the service to the remote user, host application 2412 can provide user data which is transmitted using OTT connection 2450.

Communication system 2400 can also include base station 2420 provided in a telecommunication system and comprising hardware 2425 enabling it to communicate with host computer 2410 and with UE 2430. Hardware 2425 can include communication interface 2426 for setting up and maintaining a wired or wireless connection with an interface of a different communication device of communication system 2400, as well as radio interface 2427 for setting up and maintaining at least wireless connection 2470 with UE 2430 located in a coverage area (not shown in FIG. 24) served by base station 2420. Communication interface 2426 can be configured to facilitate connection 2460 to host computer 2410. Connection 2460 can be direct, or it can pass through a core network (not shown in FIG. 24) of the telecommunication system and/or through one or more intermediate networks outside the telecommunication system. In the embodiment shown, hardware 2425 of base station 2420 can also include processing circuitry 2428, which can comprise one or more programmable processors, application-specific integrated circuits, field programmable gate arrays or combinations of these (not shown) adapted to execute instructions.

Base station 2420 also includes software 2421 stored internally or accessible via an external connection. For example, software 2421 can include program instructions (also referred to as a computer program product) that, when executed by processing circuitry 2428, can configure base station 2420 to perform operations corresponding to various example methods (e.g., procedures) described herein.

Communication system 2400 can also include UE 2430 already referred to, whose hardware 2435 can include radio interface 2437 configured to set up and maintain wireless connection 2470 with a base station serving a coverage area in which UE 2430 is currently located. Hardware 2435 of UE 2430 can also include processing circuitry 2438, which can comprise one or more programmable processors, application-specific integrated circuits, field programmable gate arrays or combinations of these (not shown) adapted to execute instructions.

UE 2430 also includes software 2431, which is stored in or accessible by UE 2430 and executable by processing circuitry 2438. Software 2431 includes client application 2432. Client application 2432 can be operable to provide a service to a human or non-human user via UE 2430, with the support of host computer 2410. In host computer 2410, an executing host application 2412 can communicate with the executing client application 2432 via OTT connection 2450 terminating at UE 2430 and host computer 2410. In providing the service to the user, client application 2432 can receive request data from host application 2412 and provide user data in response to the request data. OTT connection 2450 can transfer both the request data and the user data. Client application 2432 can interact with the user to generate the user data that it provides. Software 2431 can also include program instructions (also referred to as a computer program product) that, when executed by processing circuitry 2438, can configure UE 2430 to perform operations corresponding to various example methods (e.g., procedures) described herein.

Figure 24:
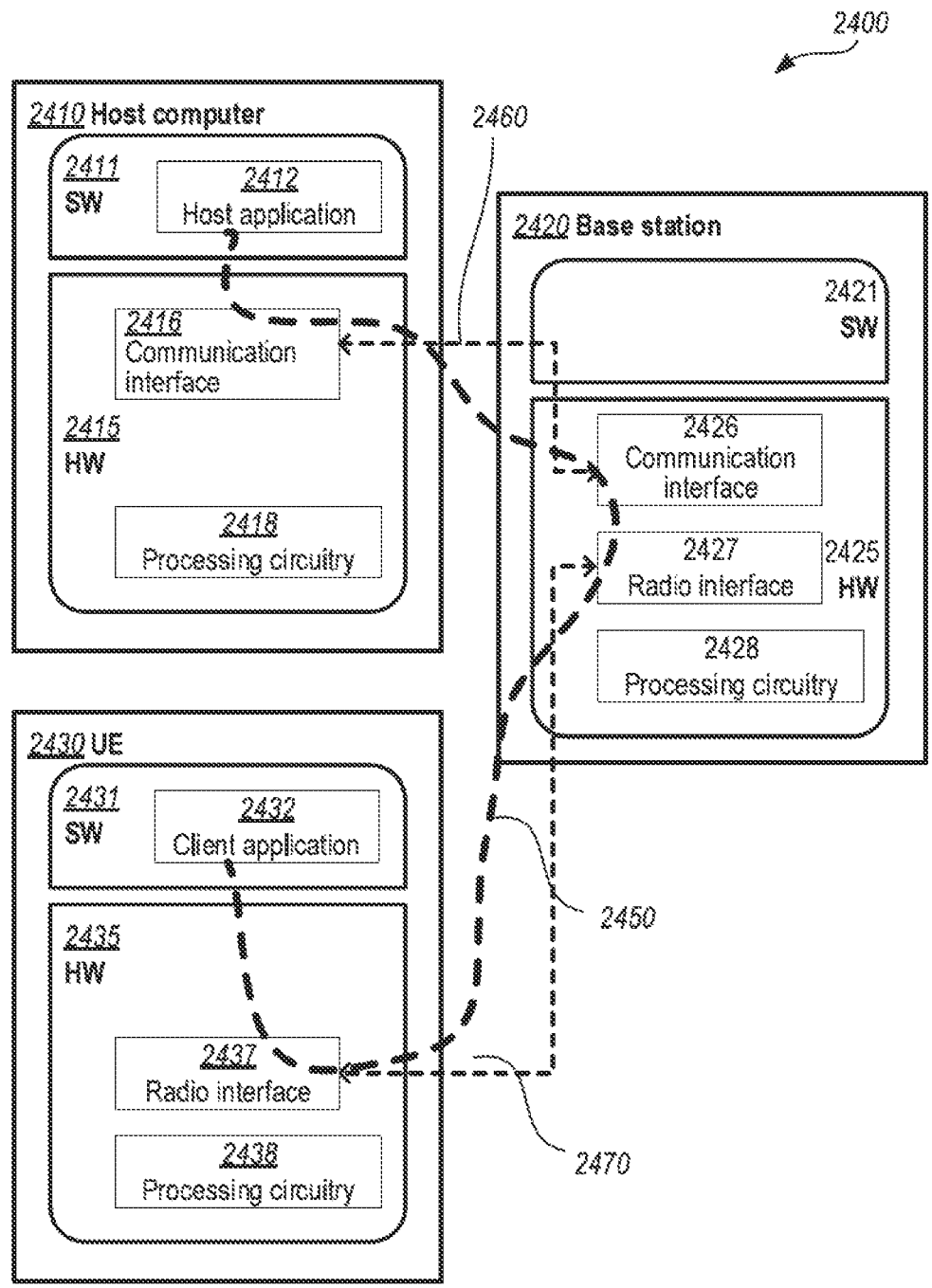

It is noted that host computer 2410, base station 2420 and UE 2430 illustrated in FIG. 24 can be similar or identical to host computer 1230, one of base stations 1612a, 1612b, 1612c and one of UEs 1691, 1692 of FIG. 16, respectively. This is to say, the inner workings of these entities can be as shown in FIG. 24 and independently, the surrounding network topology can be that of FIG. 16.

In FIG. 24, OTT connection 2450 has been drawn abstractly to illustrate the communication between host computer 2410 and UE 2430 via base station 2420, without explicit reference to any intermediary devices and the precise routing of messages via these devices. Network infrastructure can determine the routing, which it can be configured to hide from UE 2430 or from the service provider operating host computer 2410, or both. While OTT connection 2450 is active, the network infrastructure can further take decisions by which it dynamically changes the routing (e.g., on the basis of load balancing consideration or reconfiguration of the network).

Wireless connection 2470 between UE 2430 and base station 2420 is in accordance with the teachings of the embodiments described throughout this disclosure. One or more of the various embodiments improve the performance of OTT services provided to UE 2430 using OTT connection 2450, in which wireless connection 2470 forms the last segment. More precisely, the example embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2450 between host computer 2410 and UE 2430, in response to variations in the measurement results. The measurement procedure and/or the network functionality for reconfiguring OTT connection 2450 can be implemented in software 2411 and hardware 2415 of host computer 2410 or in software 2431 and hardware 2435 of UE 2430, or both. In embodiments, sensors (not shown) can be deployed in or in association with communication devices through which OTT connection 2450 passes; the sensors can participate in the measurement procedure by supplying values of the monitored quantities exemplified above, or supplying values of other physical quantities from which software 2411, 2431 can compute or estimate the monitored quantities. The reconfiguring of OTT connection 2450 can include message format, retransmission settings, preferred routing etc.; the reconfiguring need not affect base station 2420, and it can be unknown or imperceptible to base station 2420. Such procedures and functionalities can be known and practiced in the art. In certain embodiments, measurements can involve proprietary UE signaling facilitating host computer 2410's measurements of throughput, propagation times, latency and the like. The measurements can be implemented in that software 2411 and 2431 causes messages to be transmitted, in particular empty or 'dummy' messages, using OTT connection 2450 while it monitors propagation times, errors, etc.

FIG. 25 is a flowchart illustrating an example method and/or procedure implemented in a communication system, in accordance with one embodiment. The communication system includes a host computer, a base station and a UE which, in some example embodiments, can be those described with reference to other figures herein. For simplicity of the present disclosure, only drawing references to FIG. 25 will be included in this section. In step 2510, the host computer provides user data. In substep 2511 (which can be optional) of step 2510, the host computer provides the user data by executing a host application. In step 2520, the host computer initiates a transmission carrying the user data to the UE. In step 2530 (which can be optional), the base station transmits to the UE the user data which was carried in the transmission that the host computer initiated, in accordance with the teachings of the embodiments described throughout this disclosure. In step 2540 (which can also be optional), the UE executes a client application associated with the host application executed by the host computer.

FIG. 26 is a flowchart illustrating an example method and/or procedure implemented in a communication system, in accordance with one embodiment. The communication system includes a host computer, a base station and a UE which can be those described with reference to other figures herein. For simplicity of the present disclosure, only drawing references to FIG. 26 will be included in this section. In step 2610 of the method, the host computer provides user data. In an optional substep (not shown) the host computer provides the user data by executing a host application. In step 2620, the host computer initiates a transmission carrying the user data to the UE. The transmission can pass via the base station, in accordance with the teachings of the embodiments described throughout this disclosure. In step 2630 (which can be optional), the UE receives the user data carried in the transmission.

FIG. 27 is a flowchart illustrating an example method and/or procedure implemented in a communication system, in accordance with one embodiment. The communication system includes a host computer, a base station and a UE which can be those described with reference to other figures herein. For simplicity of the present disclosure, only drawing references to FIG. 27 will be included in this section. In step 2710 (which can be optional), the UE receives input data provided by the host computer. Additionally or alternatively, in step 2720, the UE provides user data. In substep 2721 (which can be optional) of step 2720, the UE provides the user data by executing a client application. In substep 2711 (which can be optional) of step 2710, the UE executes a client application which provides the user data in reaction to the received input data provided by the host computer. In providing the user data, the executed client application can further consider user input received from the user. Regardless of the specific manner in which the user data was provided, the UE initiates, in substep 2730 (which can be optional), transmission of the user data to the host computer. In step 2740 of the method, the host computer receives the user data transmitted from the UE, in accordance with the teachings of the embodiments described throughout this disclosure.

FIG. 28 is a flowchart illustrating an example method and/or procedure implemented in a communication system, in accordance with one embodiment. The communication system includes a host computer, a base station and a UE which can be those described with reference to other figures herein. For simplicity of the present disclosure, only drawing references to FIG. 28 will be included in this section. In step 2810 (which can be optional), in accordance with the teachings of the embodiments described throughout this disclosure, the base station receives user data from the UE. In step 2820 (which can be optional), the base station initiates transmission of the received user data to the host computer. In step 2830 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and example embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various example embodiments can be used together with one another, as well as interchangeably therewith, as should be understood by those having ordinary skill in the art.

The invention claimed is:

1. A host computer, comprising:
    processing circuitry configured to provide user data; and
    a communication interface configured to forward the user data to a cellular network for transmission to a user equipment (UE), wherein the cellular network comprises a key management server configured to perform operations comprising:
    receiving, from an authentication server function (AUSF), the following information associated with a particular user:
        a non-application-specific anchor security key (Kakma);
        a first identifier (KakmaID) of the non-application-specific anchor security key; and
        a second identifier related to a network subscription;
    receiving, from an application function, a request for a security key (Kaf) specific to an application session for the particular user, wherein the request comprises a further identifier (KakmaID) of a non-application-specific anchor security key associated with the particular user; and
    based on a match between the first identifier and the further identifier, generating the security key (Kaf) specific to the application session based on the non-application-specific anchor security key (Kakma).

2. The host computer of claim 1, wherein the key management server comprises a plurality of anchor function for authentication and key management for applications (AAnF) instances, each AAnF instance corresponding to a range of user equipment routing indicators (RIDs);

the request also includes a routing indicator (RID) associated with the particular user;
the operations further comprising selecting an AAnF instance based on the received RID; and
generating the security key (Kaf) specific to the application session is performed by the selected AAnF instance.

3. The host computer of claim 1, wherein the second identifier is a subscription permanent identifier (SUPI).

4. The host computer of claim 1, wherein the key management server is associated with one or more ranges of user equipment routing indicators (RIDs); and
the operations further comprise registering an association between the key management server and the one or more ranges with a network repository function (NRF) in the communication network.

5. A non-transitory computer readable medium comprising instructions that, when executed by a processor in a host computer of a communication system, cause the host computer to perform operations comprising:
providing user data; and
forwarding the user data to a cellular network, via a communication interface, for transmission to a user equipment (UE), wherein the cellular network comprises a key management server configured to perform operations comprising:
receiving, from an authentication server function (AUSF), the following information associated with a particular user:
a non-application-specific anchor security key (Kakma);
a first identifier (KakmaID) of the non-application-specific anchor security key; and
a second identifier related to a network subscription;
receiving, from an application function, a request for a security key (Kaf) specific to an application session for the particular user, wherein the request comprises a further identifier (KakmaID) of a non-application-specific anchor security key associated with the particular user; and
based on a match between the first identifier and the further identifier, generating the security key (Kaf) specific to the application session based on the non-application-specific anchor security key (Kakma).

6. The non-transitory computer readable medium of claim 5, wherein:
the key management server comprises a plurality of anchor function for authentication and key management for applications (AAnF) instances, each AAnF instance corresponding to a range of user equipment routing indicators (RIDs);
the request also includes a routing indicator (RID) associated with the particular user;
the operations performed by the key management server further comprise selecting an AAnF instance based on the received RID; and
generating the security key (Kaf) specific to the application session is performed by the selected AAnF instance.

7. The non-transitory computer readable medium of claim 5, wherein the second identifier is a subscription permanent identifier (SUPI).

8. The non-transitory computer readable medium of claim 5, wherein:
the key management server is associated with one or more ranges of user equipment routing indicators (RIDs); and
the operations performed by the key management server further comprise registering an association between the key management server and the one or more ranges with a network repository function (NRF) in the communication network.

9. A method performed by a host computer in a communication system, comprising:
providing user data; and
forwarding the user data to a cellular network, via a communication interface, for transmission to a user equipment (UE), wherein the cellular network comprises a key management server configured to perform operations comprising:
receiving, from an authentication server function (AUSF), the following information associated with a particular user:
a non-application-specific anchor security key (Kakma);
a first identifier (KakmaID) of the non-application-specific anchor security key; and
a second identifier related to a network subscription;
receiving, from an application function, a request for a security key (Kaf) specific to an application session for the particular user, wherein the request comprises a further identifier (KakmaID) of a non-application-specific anchor security key associated with the particular user; and
based on a match between the first identifier and the further identifier, generating the security key (Kaf) specific to the application session based on the non-application-specific anchor security key (Kakma).

10. The method of claim 9, wherein:
the key management server comprises a plurality of anchor function for authentication and key management for applications (AAnF) instances, each AAnF instance corresponding to a range of user equipment routing indicators (RIDs);
the request also includes a routing indicator (RID) associated with the particular user;
the operations method further comprises selecting an AAnF instance based on the received RID; and
generating the security key (Kaf) specific to the application session is performed by the selected AAnF instance.

11. The method of claim 9, wherein the second identifier is a subscription permanent identifier (SUPI).

12. The method of claim 9, wherein:
the key management server is associated with one or more ranges of user equipment routing indicators (RIDs); and
the operations further comprise registering an association between the key management server and the one or more ranges with a network repository function (NRF) in the communication network.

* * * * *